US011194181B2

(12) United States Patent
Miyazaki et al.

(10) Patent No.: US 11,194,181 B2
(45) Date of Patent: Dec. 7, 2021

(54) OPTICAL MODULATOR AND OPTICAL MODULE USING THIS

(71) Applicant: SUMITOMO OSAKA CEMENT CO., LTD., Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 17/256,396

(22) PCT Filed: Jun. 28, 2019

(86) PCT No.: PCT/JP2019/025883
§ 371 (c)(1),
(2) Date: Dec. 28, 2020

(87) PCT Pub. No.: WO2020/004637
PCT Pub. Date: Jan. 2, 2020

(65) Prior Publication Data
US 2021/0157176 A1    May 27, 2021

(30) Foreign Application Priority Data
Jun. 29, 2018  (JP) .............................. JP2018-124467

(51) Int. Cl.
*G02F 1/035*  (2006.01)
*G02B 6/27*  (2006.01)
*G02F 1/01*  (2006.01)
*G02F 1/313*  (2006.01)

(52) U.S. Cl.
CPC ........... *G02F 1/035* (2013.01); *G02B 6/2773* (2013.01); *G02F 1/0147* (2013.01); *G02F 1/3131* (2013.01)

(58) Field of Classification Search
CPC ...... G02F 1/035; G02F 1/0147; G02F 1/3131; G02F 1/03; G02F 1/01; G02F 2203/21; G02B 6/2773
See application file for complete search history.

(56) References Cited

U.S. PATENT DOCUMENTS

2018/0120670 A1*  5/2018  Doi ....................... G02F 1/3521

FOREIGN PATENT DOCUMENTS

| JP | 2015-69162 | 4/2015 |
|---|---|---|
| JP | 2015-102786 | 6/2015 |
| JP | 2016-99508 | 5/2016 |
| JP | 2016-200763 | 12/2016 |
| JP | 2018-72605 | 5/2018 |

OTHER PUBLICATIONS

International Search Report dated Sep. 24, 2019, Application No. PCT/JP2019/025883, 4 pages.

* cited by examiner

*Primary Examiner* — John Bedtelyon
(74) *Attorney, Agent, or Firm* — Rankin, Hill & Clark LLP

(57) ABSTRACT

An optical modulator including an optical modulation element including an optical waveguide formed on a substrate, and a housing that accommodates the optical modulation element. The housing has a high-thermal resistance portion within at least a part of an optical input and output region. The optical input and output region is an area ranging from an outer surface of a first short side wall to a first end portion of the optical modulation element, and the high-thermal resistance portion having a higher thermal resistance than a portion of the housing other than the optical input and output region.

8 Claims, 18 Drawing Sheets

OPTICAL MODULATOR AND OPTICAL MODULE USING THIS

TECHNICAL FIELD

The present invention relates to an optical modulator and an optical module that performs an optical communication operation using the optical modulator.

BACKGROUND ART

In recent years, the digital coherent transmission technology, which started to be applied to long-distance optical communication, also has been continuously applied to metro optical communication such as medium-distance and short-distance optical communication due to an additionally increasing communication demand. In such digital coherent transmission, dual polarization-quadrature phase shift keying (DP-QPSK) modulators in which a LiNbO$_3$ (hereinafter, referred to as LN) substrate is typically used are used as optical modulators. Hereinafter, optical modulators in which a LiNbO$_3$ substrate is used will be referred to as LN modulators.

Such an optical modulator is used in a state of being mounted in an optical module that performs an optical communication operation together with, for example, a driver integrated circuit (IC) that outputs an electric signal for causing the optical modulator to perform a modulation operation or a circuit board on which a digital signal processor (DSP) that processes a signal input from a higher-level device at a high speed and inputs transmission data to the driver IC is disposed.

In short-distance applications such as metro optical communication, there is a high demand particularly for the size reduction of optical modules, and a variety of studies are underway to reduce the mounting area of an optical modulator as a whole, including an excess-length processing space for optical fibers provided in an optical modulator, in addition to the size reduction of the housing of the optical modulator (modulator housing).

For example, Patent Literature 1 discloses a configuration of an optical modulator in which an input optical fiber and an output optical fiber are disposed adjacent to one wall of a modulator housing. In such an optical modulator, compared with a configuration in which an input optical fiber and an output optical fiber are disposed in two facing walls of a modulator housing, respectively, it is possible to provide an excess-length processing space for an optical fiber on a single side of the modulator housing in a concentrated manner and to reduce the mounting area of the optical modulator as a whole.

However, the demand for device size reduction still remains unchanged, and, in the future, it is likely that the mounting densities of optical components and electronic components in an optical module housing gradually increase in association with the above-described reduction of the mounting area due to an increasing demand for additional size reduction. As a result, it is possible to expect a status where a heat-generating electronic component such as a driver IC or a DSP and an optical modulator are disposed extremely close to each other in an optical module housing.

Typically, a driver IC consumes approximately 1 W of electricity for the necessity of outputting high frequency signals having a voltage magnitude of several volts to several tens of volts. In addition, a DSP that is used, particularly, in optical modules consumes approximately 10 to 30 W of electricity for the necessity of processing signals of several tens to several hundreds of Mbs at a high speed. In addition, the consumed power is emitted from the driver IC or DSP mainly as heat.

Meanwhile, optical modulators include an optical crystal (for example, the above-described LN) that is relatively sensitive to temperature in terms of characteristics and reliability in a housing (modulator housing) and accommodate an optical component requiring submicron-level positional accuracy.

Therefore, conventionally, in an optical module housing, an optical modulator and a heat-generating electronic component are disposed at positions that are as far apart as possible such that heat emitted from the heat-generating electronic component does not affect the optical modulator. In addition, in order to suppress the temperature of each portion in the optical module housing being raised by heat generated from the heat-generating electronic component, it is also proposed to dissipate heat from the heat-generating electronic component to the outside of the optical module by bringing the heat-generating electronic component into contact with the optical module housing directly or through a heat-dissipating gel (for example, Patent Literature 2).

However, among optical components and electronic components that are used in an optical module housing, an optical modulator has an extremely large mounting area or occupancy relative to volume in the optical module housing, and there may be limitations on the size reduction of optical modules at some point in order to secure a separation distance between such a large optical modulator and an electronic component to an extent of a certain distance or longer. That is, as the size reduction of optical modules progresses, it is inevitable to dispose an optical modulator and a heat-generating electronic component close to each other, and there is a demand for an optical modulator capable of avoiding the degradation of characteristics and long-term reliability even in the case of being disposed close to a heat-generating electronic component.

As techniques for suppressing the degradation of the reliability of optical modulators or the like attributed to heat applied from the outside, for example, Patent Literature 3 discloses the reduction of the wall thickness of the housing between a feedthrough-fixed portion and an optical modulation element-fixed portion in order to prevent the occurrence of deterioration or breakdown in an optical modulation element in the housing due to heat generated at the time of fixing a feedthrough portion, into which an optical fiber is introduced, to the housing by soldering during manufacturing.

However, the configuration described in Patent Literature 3 is intended to prevent heat generated only in the fixation-by-soldering step during manufacturing and applied for an extremely short period of time of approximately several seconds to several tens of seconds from being transferred to the optical modulation element and is not intended to enlighten a measure for preventing the fluctuation of optical characteristics attributed to heat that is continuously applied from the outside during operation or the degradation of long-term reliability.

Furthermore, usually, optical modulator housing are designed to have as uniform a wall thickness as possible from the viewpoint of ease of manufacturing or the avoidance of stress concentration during the fluctuation of the ambient temperature. In contrast, to an modulator housing of an optical modulator mounted in an optical module housing, heat is uniformly applied from all directions in association with the fluctuation of the ambient temperature only in a few cases, and there are many cases where heat is applied locally from a heat-generating electronic component.

However, the configuration described in Patent Literature 3 is intended to prevent heat generated only in the fixation-by-soldering step during manufacturing and applied for an extremely short period of time of approximately several seconds to several tens of seconds from being transferred to the optical modulation element and is not intended to enlighten a measure for preventing the fluctuation of optical characteristics attributed to heat that is continuously applied from the outside during operation or the degradation of long-term reliability attributed to heat that is continuously applied during the operation period.

Furthermore, usually, optical modulator housing are designed to have as uniform a wall thickness as possible from the viewpoint of ease of manufacturing or the avoidance of stress concentration during the fluctuation of the ambient temperature. In contrast, to an modulator housing of an optical modulator mounted in an optical module housing, unlike a case where heat is uniformly applied from all directions in association with the fluctuation of the ambient temperature, heat is often applied locally from a heat-generating electronic component.

FIG. 17 is a plan view schematically showing the configuration of a conventional optical modulator as described in Patent Literature 1. An optical modulator 1700 shown in the drawing includes, for example, an optical modulation element 1702 and a modulator housing 1704 that accommodates the optical modulation element 1702. The optical modulation element 1702 is, for example, a Mach-Zehnder optical modulator, which is a so-called interference type optical modulation element that operates using the interference of light by controlling the phase difference between parallel waveguides formed on a LN substrate.

In addition, the optical modulator 1700 includes an input optical fiber 1708 that inputs light to the optical modulation element 1702 and an output optical fiber 1710 that outputs light modulated by the optical modulation element 1702. Both the input optical fiber 1708 and the output optical fiber 1710 are disposed in, for example, the wall on one edge of the modulator housing 1704 that is on the left side in the drawing. The input optical fiber 1708 is introduced into the modulator housing 1704 from the wall on the left side in the drawing and then extends in the modulator housing 1704 in the rightward direction in the drawing. Light that is output from the input optical fiber 1708 is input to a light folded-back portion 1712 formed of, for example, a lens or a prism. The light folded-back portion 1712 folds back the propagation direction of light from the input optical fiber 1708 180 degrees and inputs the light to the end surface of the optical modulation element 1702 on the right side in the drawing. The light input to the optical modulation element 1702 is modulated by the optical modulation element 1702 and then output from the end portion of the optical modulation element 1702 on the left side in the drawing. In addition, the light output from the optical modulation element 1702 is input to the output optical fiber 1710 through an output optical system 1714 made up of, for example, a polarization beam combining prism, a wave plate, and a lens and is guided to the outside of the modulator housing 1704.

Here, the modulator housing 1704 usually has a substantially rectangular shape in a plan view and is configured in the same thickness t17 that is large enough to secure necessary stiffness such that the respective wall thicknesses on the four edges become as uniform as possible. In reality, since a lead pin, a relay board, or the like, not shown, for receiving a high frequency signal from the outside of the modulator housing 1704 and inputting the high frequency signal to the optical modulation element 1702 is mounted in the modulator housing 1704, a protrusion and a recess are provided on the inner surface portion of the wall as necessary. However, these protrusion and recess are provided in a limited range as necessary in order for the disposition of an auxiliary component and do not cause technically meaningful unevenness in the thicknesses of the four walls of the modulator housing 1704. It is necessary to understand that FIG. 17 schematically shows the modulator housing 1704 such that the wall thicknesses on the four edges are each the average thickness on the corresponding edge.

The conventional optical modulator 1700 is configured such that (the average value of) the wall thicknesses on the four edges of the modulator housing 1704 become substantially the same value t17 and has a structure that is symmetrical with respect to a center line 1720 with respect to the width direction and a center line 1722 with respect to the longitudinal direction. Therefore, in a case where heat from the ambient environment of the optical modulator 1700 is uniformly applied to the modulator housing 1704, the deformation of the modulator housing 1704 is suppressed in a minute range, and the degree of the fluctuation of the characteristics or the degradation of reliability is also suppressed. Here, the "average value" of the wall thickness refers to the average value of the thickness of parts of the corresponding wall or wall, and, even in a case where the wall or a part of the wall is connected to or intersects an adjacent wall, the average value refers to the average value of the thickness of the so-called "wall" itself or the part of the "wall" itself, not including the connecting or intersecting part. For example, in a case where the inner surface of the corresponding wall or a part of the wall (the inside surface of the modulator housing) is connected to the inner surface of an adjacent wall through a curved portion (R-processed portion), the average value refers to the average value of the thickness of the "wall" itself or the part of the "wall" itself, excluding the curved portion.

However, in a case where the optical modulator 1700 is mounted in an optical module, heat propagating from a heat-generating electronic component disposed adjacent to the optical modulator 1700 usually propagates to a part of the modulator housing 1704 almost locally and diffuses toward the entire modulator housing 1704. Therefore, in the optical module, usually, heat is not uniformly applied to the modulator housing 1704.

FIG. 18 schematically shows a temperature distribution generated in the modulator housing 1704 in a case where the optical modulator 1700 is mounted on a circuit board 1802 of an optical module together with, for example, a DSP 1800, which is a heat-generating electronic component. Black/white shades shown over the modulator housing 1704 shown in the drawing indicate the temperatures of individual portions and indicate that, as the white shade becomes lighter, the temperature becomes lower, and, as the black shade becomes darker, the temperature becomes higher.

In the drawing, heat from the DSP 1800 disposed on the lower right edge of the drawing on the circuit board 1802 mainly propagates through the circuit board 1802 and flows into the modulator housing 1704 from a portion that faces the DSP 1800 on a side of the modulator housing 1704 on the lower side of the drawing. In addition, the heat that has flowed in from the portion propagates to the upper left side of the drawing toward the entire modulator housing 1704.

As a result, in the modulator housing 1704, a temperature gradient is generated such that the temperature decreases from the lower right side to the upper left side as shown in the drawing. Such a temperature gradient is not generated in a case where the temperature of the entire modulator housing 1704 changes in association with a change in the environmental temperature and is generated due to the fact that the DSP 1800 acts as an eccentric heat source that is positioned asymmetrically with respect to the modulator housing 1704. More specifically, this temperature gradient arises from the fact that the size of the DSP 1800 is usually smaller than the size of the modulator housing 1704 and the DSP 1800 is disposed close to a part of the edge of the modulator housing 1704.

In addition, as a result of the DSP 1800 acting as an asymmetric and eccentric heat source as described above, this temperature gradient is generated along a direction 1804 (the white broken line in the drawing) that is different from both directions of the center line 1720 with respect to the width direction and the center line 1722 with respect to the longitudinal direction of the modulator housing 1704 as shown in the drawing and generates an asymmetric temperature distribution in the modulator housing 1704.

Such an asymmetric temperature distribution in the modulator housing 1704 is significantly different from a temperature change that is expected by the design concept of the conventional modulator housing 1704, which is "making the wall thicknesses on the four edges the same to suppress deformation", that is, "a uniform temperature change" in the modulator housing 1704 and may cause characteristic fluctuations and the degradation of long-term reliability that are beyond designers' prediction.

In addition, this temperature gradient is generated along the direction 1804 (the white broken line in the drawing) that is different from both directions of the center line 1720 with respect to the width direction and the center line 1722 with respect to the longitudinal direction of the modulator housing 1704 as shown in the drawing as a result of the DSP 1800 acting as an asymmetric and eccentric heat source as described above and generates an asymmetric temperature distribution in the modulator housing 1704.

Such an asymmetric temperature distribution in the modulator housing 1704 is significantly different from a status that is expected by the design concept of the conventional modulator housing 1704, which is "making the wall thicknesses on the four edges the same to suppress deformation", that is, "a uniform temperature change" in the modulator housing 1704 and may cause characteristic fluctuations and the degradation of long-term reliability that are beyond designers' prediction.

For example, in an accelerated aging test for predicting the long-term reliability of electronic components and optical components regulated in industrial standards such as Telcodia or JIS, optical modulators, which are test objects, are put into constant-temperature baths set to a variety of temperatures (for example, 100° C., 125° C., and the like), respectively, and the amounts of characteristic fluctuations of the respective optical modulators are measured whenever predetermined elapsed times are reached. That is, what is predicted from such an accelerated aging test is long-term reliability in a case where the optical modulator 1700 is continuously used in a uniform temperature state. Therefore, the long-term reliability of the optical modulator 1700 in a status where an asymmetric temperature distribution is generated in an optical module as described above may become significantly different from the above-described prediction.

In addition, due to the asymmetric temperature distribution in the modulator housing 1704, an asymmetric temperature distribution is also generated in the surface of a substrate that configures the optical modulation element 1702. Therefore, particularly, in a case where an interference type optical modulation element such as a Mach-Zehnder optical modulator is used as the optical modulation element 1702 as described above, mutually different additional phase differences that are attributed to the asymmetric temperature distribution are generated between parallel waveguides adjacent to each other on the substrate, and the characteristics and reliability of the optical modulation element 1702 itself may also be adversely affected. That is, in an optical modulator in which an interference type optical modulation element is used, due to an asymmetric temperature distribution that is generated over a long period of time by the disposition of the optical modulator close to a heat-generating electronic component, it is expected that characteristic fluctuations and the degradation of reliability that cannot be predicted in the accelerated aging test or the like occurs particularly significantly.

Furthermore, in a case where a heat-generating electronic component is disposed close to an optical modulator as described above, heat that has flowed into the modulator housing from the heat-generating electronic component easily propagates up to the mounting position of an optical modulation element or an optical component such as a lens disposed in the modulator housing, which may cause characteristic fluctuations in the optical modulator and may degrade the long-term reliability.

CITATION LIST

Patent Literature

[Patent Literature No. 1] Japanese Laid-open Patent Publication No. 2018-72605
[Patent Literature No. 2] Japanese Laid-open Patent Publication No. 2016-99508
[Patent Literature No. 3] Japanese Laid-open Patent Publication No. 2015-102786

SUMMARY OF INVENTION

Technical Problem

From the above-described background, there is a desire for realizing an optical modulator capable of suppress characteristic fluctuations and the degradation of long-term reliability attributed to the disposition of a heat source such as an electronic component close to the optical modulator.

Solution to Problem

One aspect of the present invention includes an optical modulation element including an optical waveguide formed on a substrate and a housing that accommodates the optical modulation element, the housing has a bottom surface wall having a quadrilateral shape in a plan view, a first short side wall and a second short side wall that are connected to two opposite edges of the bottom surface wall, and a first long side wall and a second long side wall that are longer than the first short side wall and the second short side wall and are connected to two other opposite edges of the bottom surface wall, the optical modulation element is accommodated in a space surrounded by the bottom surface wall, the first long side wall and the second long side wall, and the first short side wall and the second short side wall, a light input terminal portion that holds an input optical fiber that inputs light to the optical modulation element and alight output terminal portion that holds an output optical fiber that guides light output from the optical modulation element to an outside of the housing are both fixed to the first short side wall, the optical modulation element is disposed such that a first end portion of the optical modulation element in a longitudinal direction faces the first short side wall, and the housing has a high-thermal resistance portionoptical input and output regionoptical input and output region within at least a part of an optical input and output region, the optical input and output region being an area raging from an outer surface of the first short side wall to the first end portion of the optical modulation element, and the high-thermal resistance portion having a higher thermal resistance than a portion of the housing other than the optical input and output region.

According to another aspect of the present invention, optical input and output region the first short side wall is formed such that an average thickness of the first short side wall is thinner than an average thickness of a portion of the first long side wall other than the optical input and output region and is thinner than an average thickness of a portion of the second long side wall other than the optical input and output region.

According to another aspect of the present invention, optical input and output regionoptical input and output regionoptical input and output regionoptical input and output region the first long side wall has a first thin wall portion within at least a part of a portion included in the optical input and output region, the first thin wall portion having an average thickness thinner than an average thickness of a portion of the first long side wall outside the optical input and output region, the second long side wall has a second thin wall portion within at least a part of a portion included in the optical input and output region, the second thin wall portion having an average thickness thinner than an average thickness of a portion of the second long side wall outside the optical input and output region, and the first thin wall portion in the first long side wall and the second thin wall portion in the second long side wall configure the high-thermal resistance portion.

According to another aspect of the present invention, optical input and output regionoptical input and output region the bottom surface wall has a third thin wall portion within at least a part of a portion included in the optical input and output region, the third thin wall portion having an average thickness thinner than an average thickness of a portion of the bottom surface wall outside the optical input and output region, and the third thin wall portion in the bottom surface wall configures the high-thermal resistance portion.

According to another aspect of the present invention, optical components are disposed on the third thin wall portion in the bottom surface wall.

According to another aspect of the present invention, at least one of the optical components disposed on the third thin wall portion in the bottom surface wall is fixed to the third thin wall portion in the bottom surface wall through a pedestal that is a separate body.

According to another aspect of the present invention, in the housing, a drive circuit that drives the optical modulation element is disposed in a rear portion that is a range from a second end portion of the optical modulation element that faces the first end portion to an inner surface of the second short side wall, and the bottom surface wall is formed such that an average thickness in the rear portion is thicker than an average thickness in the optical input and output region or the first long side wall or the second long side wall is formed such that an average thickness in the rear portion is thicker than an average thickness in the optical input and output region.

According to another aspect of the present invention, an optical component is fixed to the first end portion of the optical modulation element, the bottom surface wall has, on an inner surface, a stepped portion that connects two flat surfaces that are different in height from an outer surface of the bottom surface wall, and the optical modulation element is disposed on the bottom surface wall such that the first end portion protrudes from the stepped portion.

Another aspect of the present invention is an optical module including any one of the above-described optical modulators and an electronic component.

It should be noted that the entire contents of Japanese Patent Application No. 2018-124467 filed on Jun. 29, 2018 is incorporated into this specification by reference.

Advantageous Effects of Invention

According to the present invention, in the optical modulator, it is possible to suppress characteristic fluctuations and/or the degradation of long-term reliability even in a case where a heat source such as an electronic component is disposed close to the optical modulator.

DESCRIPTION OF EMBODIMENTS

Hereinafter, embodiments of the present invention will be described with reference to drawings.

The present invention configures an optical modulator, which has been attempted not to be disposed close to a heat-generating electronic component in the related art, as an optical device that can be disposed close to a heat-generating electronic component and paves the way for the use of optical modulators as a device capable of actively contributing to improvement in thermal environment in optical modules.

That is, an optical modulator according to the present invention is intended to adjust the side wall thickness of a modulator housing such that the modulator housing is made to actively act as a heat sink or a favorable thermal conductor. In addition, at that time, unlike the related art, the thermal conduction to an optical modulation element is not avoided, and, on the basis of an idea totally opposite to the related art, the housing is configured to allow heat to be easily conducted to the entire optical modulation element, but an optical input and output region in which an optical component is mounted is configured to suppress thermal conduction. Therefore, an asymmetric temperature distribution in the optical modulation element is avoided, the thermal conduction to the optical component is avoided, and characteristic fluctuations and the degradation of long-term reliability in the optical modulator as a whole are avoided.

Specifically, in the optical modulator of the present invention, a high-thermal resistance portion having a higher thermal resistance than portions of the modulator housing other than the optical input and output region is provided in at least a part of the optical input and output region that is a range from the outer surface of one wall where an input optical fiber and an output optical fiber are disposed to one end portion of the optical modulation element that faces the one wall in the modulator housing that configures the optical modulator. Therefore, even in a case where the wall thickness of the modulator housing is increased to use the modulator housing as a propagation path of heat from a heat-generating electronic component, it is possible to suppress the occurrence of characteristic fluctuations and or the degradation of long-term reliability in the optical modulator.

First Embodiment

First, a first embodiment will be described. An optical modulator according to the present embodiment has a characteristic configuration in which one wall of a modulator housing where an input optical fiber and an output optical fiber are disposed is formed to have an average thickness smaller than the average thickness of each of two walls that are connected to both side portions of the one wall in a portion other than the input and output portion to configure a high-thermal resistance portion.

Figure 1:
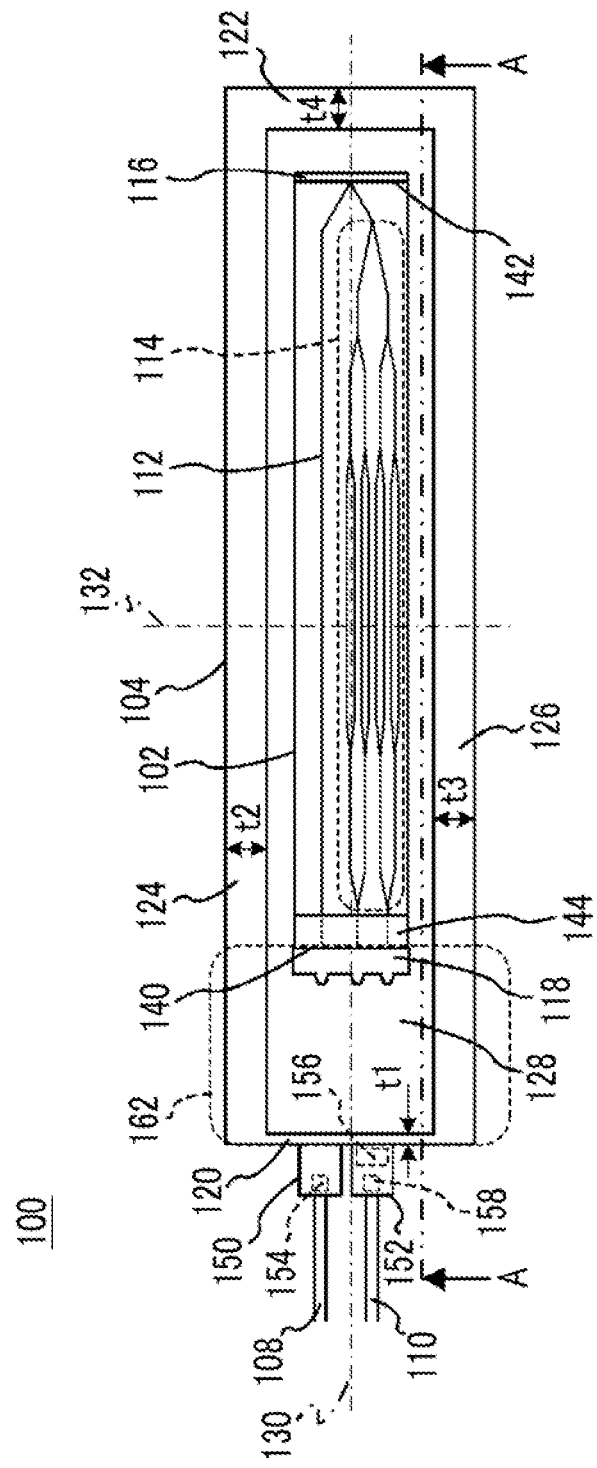
FIG. 1 is a plan view of an optical modulator according to a first embodiment of the present invention.
Figure 2:
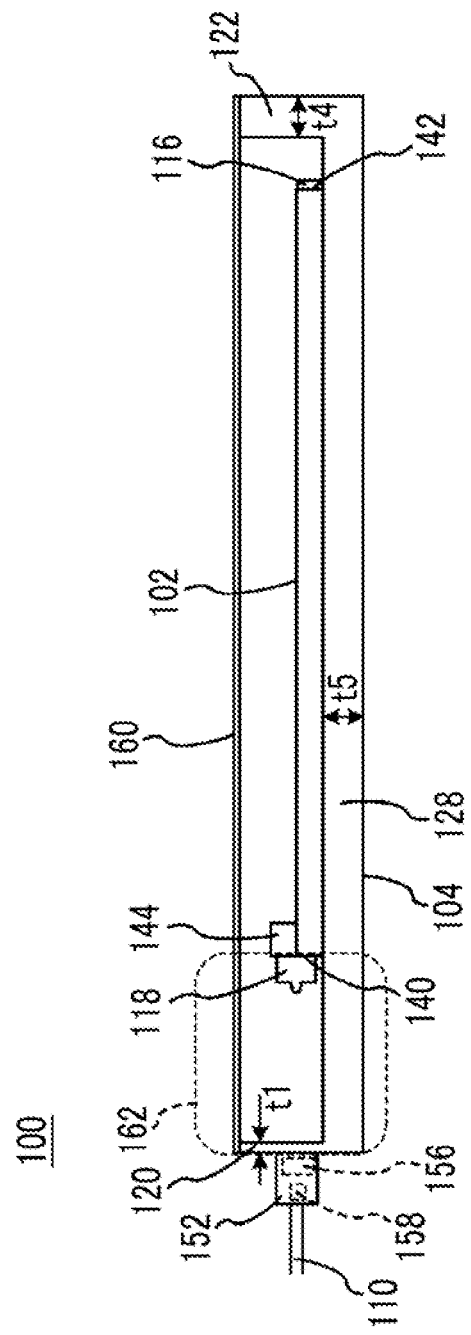
FIG. 2 is a cross-sectional view of the optical modulator shown in FIG. 1 taken along the line AA.

FIG. 1 is a plan view showing the configuration of an optical modulator 100 according to the first embodiment of the present invention, and FIG. 2 is a cross-sectional view of the optical modulator 100 taken along the line AA. The optical modulator 100 includes an optical modulation element 102, a modulator housing 104 that accommodates the optical modulation element 102, an input optical fiber 108 that inputs light to the optical modulation element 102, and an output optical fiber 110 that guides light output from the optical modulation element 102 to the outside of the modulator housing 104.

It should be noted that, since the modulator housing 104 is airtightly sealed, it is not possible to actually observe the inside of the modulator housing 104; however, in FIG. 1, configuration elements in the modulator housing 104 are indicated with solid lines in order to facilitate the understanding of the configuration in the modulator housing 104.

The modulator housing 104 is made of metal (for example, stainless steel, KOVAR, or the like) and has a rectangular shape or a quadrilateral shape (for example, an oblong shape or a substantially oblong shape) in a plan view. That is, the modulator housing 104 has a bottom surface wall 128 having a quadrilateral shape in a plan view, a first short side wall 120 and a second short side wall 122 that are connected to two opposite edges (the right and left sides in the drawing) of the bottom surface wall 128. In addition, the modulator housing 104 has a first long side wall 124 and a second long side wall 126 that are longer than the first short side wall 120 and the second short side wall 122 and are connected to two opposite edges (the upper and lower edges in the drawing of FIG. 1) of the bottom surface wall 128. In addition, the optical modulation element 102 is accommodated in a space surrounded by the first short side wall 120, the second short side wall 122, the first long side wall 124, the second long side wall 126, and the bottom surface wall 128.

Here, in the optical modulation elements 102, an end portion that faces the first short side wall 120 where a light input terminal portion 150 and a light output terminal portion 152, which will be described below, are disposed is defined as a first end portion 140, and an end portion that is opposite to the first end portion 140 is defined as a second end portion 142. Therefore, the second end portion 142 faces the second short side wall 122.

It should be noted that, in a plan view of the modulator housing 104, a line extending in the horizontal direction in the drawing along the center of the modulator housing 104 in the width direction is defined as a centerline 130 with respect to the width direction, and a line extending in the vertical direction in the drawing along the center of the modulator housing 104 with respect to the longitudinal direction is defined as a centerline 132 with respect to the longitudinal direction.

The optical modulation element 102 is a waveguide-type optical modulator made up of optical waveguides formed on a substrate. Specifically, in the present embodiment, the optical modulation element 102 is made up of, for example, optical waveguides provided on a LiNbO$_3$ substrate. The optical modulation element 102 has an input waveguide 112 to which light from the input optical fiber 108 is input, a modulation portion 114 made up of a group of optical waveguides that perform an optical modulation operation, and a light reflection film 116 that configures a light folded-back portion provided in the second end portion 142.

The modulation portion 114, for example, causes light that propagates through a plurality of optical waveguides extending in the longitudinal direction of the optical modulation element 102 to interfere with each other to perform a modulation operation. Specifically, the modulation portion 114 is a DP-QPSK optical modulator including four Mach-Zehnder type optical waveguides and four radio frequency (RF) electrodes (not shown) that are provided on the Mach- Zehnder type optical waveguides, respectively, and modulate light waves that propagate through the optical waveguides.

The first end portion 140 of the optical modulation element 102 is an optical input and output end where the light from the input optical fiber 108 is input to the input waveguide 112 and light modulated by the modulation portion 114 is output. The second end portion 142 on the right side of the drawing is a light folded-back end where light is folded back by the light reflection film 116. Amicrolens array 118, which is an optical component, is fixed to the first end portion 140 by, for example, adhesion. In addition, a glass block 144 for reinforcing the adhesive strength of the optical component is fixed to a surface of the substrate in the vicinity of the first end portion 140 by, for example, adhesion.

The light input terminal portion 150 that holds the input optical fiber 108 and the light output terminal portion 152 that holds the output optical fiber 110 are fixed to the first short side wall 120 of the modulator housing 104. In the light input terminal portion 150, a lens 154, which is an optical component that collimates the light from the input optical fiber 108, is disposed. In addition, in the light output terminal portion 152, a lens 158 and a polarization-combining part 156, which are optical components, are disposed. The polarization-combining part 156 is made up of a wave plate and a polarization beam combining prism and polarizes and combines two light rays that are output from the modulation portion 114 of the optical modulation element 102 (in the case of the DP-QPSK modulator, polarized beams from the X-axis port and the Y-axis port that are orthogonal to each other) to output one light ray. The lens 158 collects the light output by the polarization-combining part 156 and inputs the collected light to the output optical fiber 110.

With the above-described configuration, the light input from the input optical fiber 108 is collimated by the lens 154 in the light input terminal portion 150, then, is collected by the microlens array 118 provided in the first end portion 140 of the optical modulation element 102, and is input to the input waveguide 112 of the optical modulation element 102. The light input to the input waveguide 112 is reflected by the light reflection film 116 in the second end portion 142 and is input to the modulation portion 114 . The light input to the modulation portion 114 is modulated by the modulation portion 114 and is then output from the first end portion 140. The light from the modulation portion 114 output from the first end portion 140 is collimated by the microlens array 118 and is polymerized and combined by the polarization-combining part 156 in the light output terminal portion 152. The polarized and combined light is collected by the lens 158 in the light output terminal portion 152, is coupled to the output optical fiber 110, and is guided to the outside of the modulator housing 104 by the output optical fiber 110.

As shown in FIG. 2, the optical modulation element 102 is fixed to the inner surface (upper surface in the drawing) of the bottom surface wall 128. FIG. 2 also shows a cover 160 that configures a part of the modulator housing 104 in an opening portion of the modulator housing 104 in the upper portion in the drawing. In order to airtightly seal the inner space of the modulator housing 104 in which the optical modulation element 102 is accommodated, the cover 160 is, for example, seam-welded to four edges configured by the first short side wall 120, the second short side wall 122, the first long side wall 124, and the second long side wall 126 in FIG. 1.

It should be noted that, in the modulator housing 104, a plurality of lead pins for inputting high frequency signals for operating the optical modulation element 102, a relay board for guiding high frequency signals input from the plurality of lead pins to the RF electrodes in the optical modulation element 102, respectively, or the like may be provided (all are not shown). Therefore, on the inner surfaces of the first short side wall 120, the second short side wall 122, the first long side wall 124, and the second long side wall 126, and the inner surface of the bottom surface wall 128 of the modulator housing 104, a protrusion and a recess may be provided. However, in the present embodiment, FIG. 1 and FIG. 2 show the first short side wall 120, the second short side wall 122, the first long side wall 124, the second long side wall 126, and the bottom surface wall 128 of the modulator housing 104 each having a uniform thickness in order to facilitate understanding by avoiding unnecessarily detailed description. Hereinafter, it is necessary to understand that the above description of the thickness also applies to FIG. 4 to FIG. 15 in the same manner.

Particularly, regarding the optical modulator 100 of the present embodiment, as shown in FIG. 1, a wall thickness t1 of the first short side wall 120 of the modulator housing 104 on the left side in the drawing is formed to be thinner (that is, to have a smaller value) than wall thicknesses t2 and t3 of the first long side wall 124 and the second long side wall 126 in portions other than an optical input and output region region 162 that is a range from the outer surface of the first short side wall 120 to the first end portion 140 of the optical modulation element 102. That is, the optical modulator 100 has relationships of t1<t2 and t1<t3. Here, in a case where the optical modulator 100 is mounted on a circuit board in an optical module, any one of the first long side wall 124 and the second long side wall 126 having the wall thicknesses t2 and t3, respectively, is disposed to face a side on which, for example, a DSP, which is a heat-generating electronic component mounted on the circuit board, is mounted.

It should be noted that, as described above, in the present embodiment, FIG. 1 and FIG. 2 do not show any protrusion and recess for disposing the lead pins, the relay board, or the like, which are possibly provided in an actual modulator housing 104. Therefore, it is necessary to understand that the wall thickness of each of the first short side wall 120, the second short side wall 122, the first long side wall 124, the second long side wall 126, and the bottom surface wall 128 shown in FIG. 1 and FIG. 2 indicates the average wall thickness in each wall in a case where a protrusion and a recess are provided. That is, in the present embodiment, the wall thickness t1 is the average value of the wall thickness of the first short side wall 120.

In addition, the wall thicknesses t2 and t3 are the average values of the wall thicknesses of the first long side wall 124 and the second long side wall 126 in portions other than the optical input and output region 162, respectively. Hereinafter, "wall thickness" mentioned in the present specification refers to the average value of the wall thickness of the corresponding wall or a part of the wall (average wall thickness) unless particularly otherwise described.

It should be noted that, in the present specification, the "average value" of the wall thickness refers to the average value of the thickness of parts of the corresponding wall or wall, and, even in a case where the wall or a part of the wall is connected to or intersects an adjacent wall, the average value refers to the average value of the thickness of the so-called "wall" itself or the part of the "wall" itself, not including the connecting or intersecting part. For example, in a case where the inner surface of the corresponding wall or a part of the wall (the inside surface of the modulator housing) is connected to the inner surface of an adjacent wall through a curved portion (R-processed portion), the average value refers to the average value of the thickness of the "wall" itself or the part of the "wall" itself, excluding the curved portion.

Here, the wall thickness t2 of the first long side wall 124 and the wall thickness t3 of the second long side wall 126 in portions other than the optical input and output region 162 are larger than a value of approximately 1.5 mm, which is the wall thickness t2 that is typically used in conventional optical modulators, to realize a lower thermal resistance than the thermal resistance of long side walls in conventional optical modulators and are desirably set in, for example, a range of 2.0 mm or more and 3.0 mm or less. In addition, the wall thickness t1 of the first short side wall 120 is desirably set in, for example, a range of values of 0.5 mm or more and 1.0 mm or less.

With such a configuration, it is possible to save the mounting space while securing the stiffness of the modulator housing 104 and to use the first long side wall 124 and the second long side wall 126 as propagation paths of heat that flows in from the outside of the modulator housing 104 to cause the modulator housing 104 to function as a heat sink for a heat-generating electronic component that is disposed close to the modulator 100.

For example, in the case of a configuration where the first long side wall 124 and a second long side wall 126 have a protrusion and a recess, it is possible to form the first long side wall 124 and the second long side wall 126 in a thickness range of 1.7 mm to 4 mm, respectively, and to set the wall thicknesses t2 and t3, which are the average wall thicknesses, respectively, in a range of values of 2.0 mm or more and 3.0 mm or less. In addition, for example, in the case of a configuration where the first short side wall 120 has a protrusion and a recess, it is possible to form the first short side wall 120 in a thickness range of 0.3 mm to 1 mm and to set the wall thickness t1, which is the average wall thickness, in a range of values of 0.5 mm or more and 1.0 mm or less.

Figure 17:
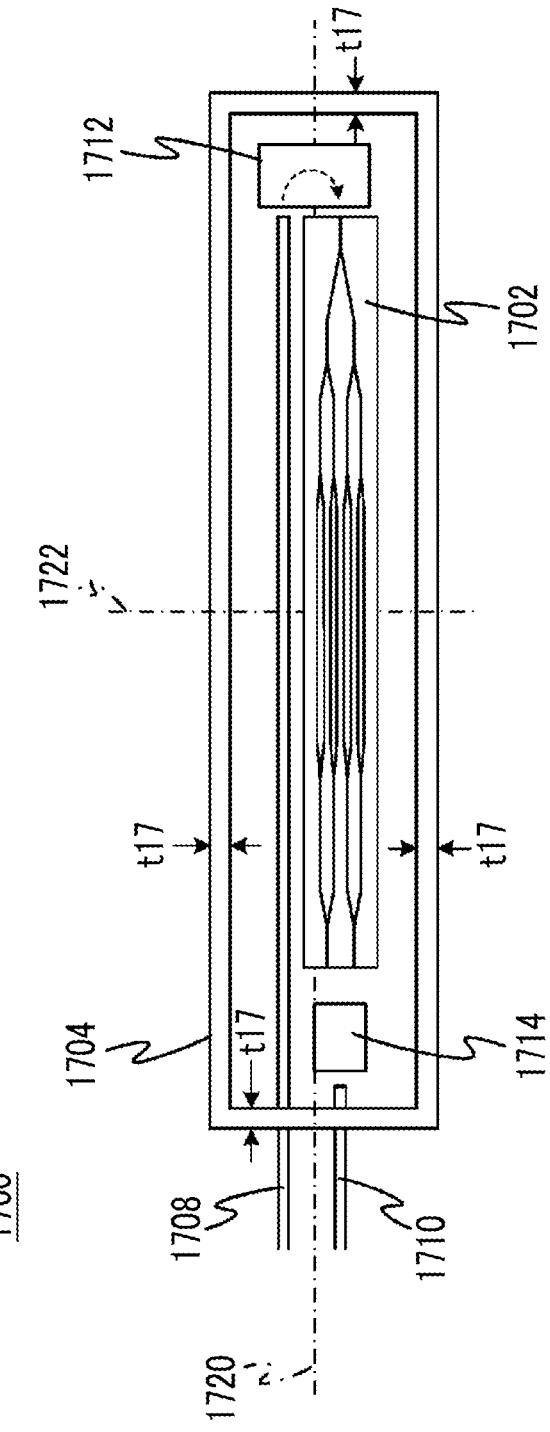
FIG. 17 is a plan view showing the configuration of a conventional optical modulator.
Figure 18:
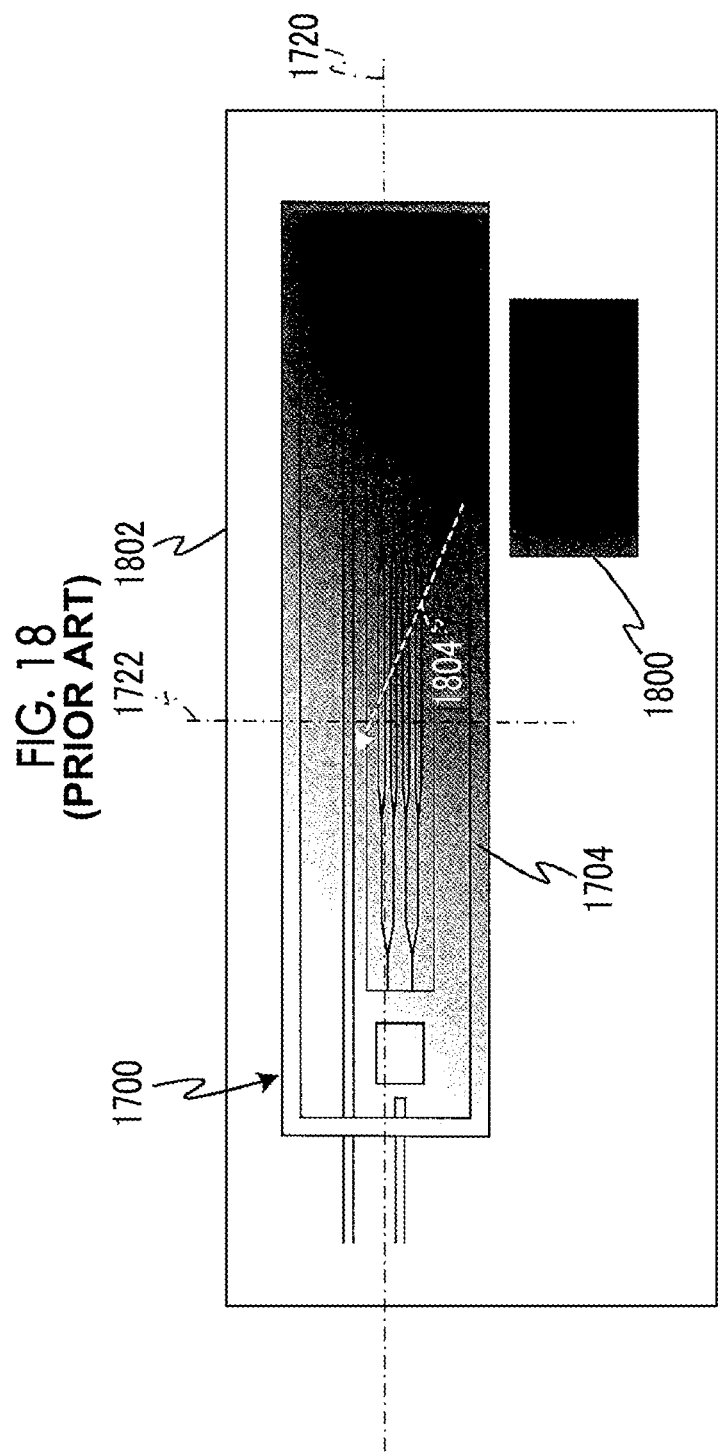
FIG. 18 is a view showing an example of a temperature distribution generated in a modulator housing in a case where the conventional optical modulator is mounted on a circuit board.

In the optical modulator 100 having the above-described configuration, since the wall thickness t2 of the first long side wall 124 and the wall thickness t3 of the second long side wall 126 are set to be thicker than those in conventional optical modulators, it is possible to reduce a temperature gradient in the longitudinal direction of the modulator housing 104 compared with conventional optical modulators (for example, the optical modulator 1700 shown in FIG. 17) by reducing the thermal resistances of the first long side wall 124 and the second long side wall 126 along the long side of the modulator housing 104. In addition, when the temperature gradient in the longitudinal direction of the modulator housing 104 is reduced as described above, the direction of the temperature gradient in the modulator housing 104 as a whole becomes a direction close to the longitudinal direction compared with the direction 1804 shown in FIG. 18. As a result, it is possible to suppress an asymmetric temperature distribution in the optical modulator 100 as a whole including the optical modulation element 102 and to suppress characteristic fluctuations and the degradation of long-term reliability.

In addition, as described above, since it is possible to suppress the generation of an asymmetric temperature distribution in the modulator housing 104 even in a case where heat flows in the first long side wall 124 and the second long side wall 126, it is possible to use the first long side wall 124 and the second long side wall 126 as propagation paths of heat from a heat-generating electronic component disposed close to the modulator 100. Therefore, it is possible to use the optical modulator 100 as a device capable of actively contributing to improvement in thermal environment in optical modules by using the optical modulator 100 as a heat sink and or a favorable thermal conductor for a heat-generating electronic component. It should be noted that, when the wall thickness t2 of the first long side wall 124 and the wall thickness t3 of the second long side wall 126 are set in a range of values of 2.0 mm or more and 3.0 mm or less, and the wall thickness t1 of the first short side wall 120 is set in a range of values of 0.5 mm or more and 1.0 mm or less as described above, with respect to the conventional average wall thickness of 1.5 mm, the above-described effect of suppressing an asymmetric temperature gradient becomes particularly significant, and the function of the optical modulator 100 as a heat sink can also be further enhanced.

It should be noted that, in the optical modulator 100, the wall thickness t1 of the first short side wall 120, which is included in the optical input and output region 162, is formed thinner than the wall thicknesses t2 and t3 of the first long side wall 124 and the second long side wall 126 in portions other than the optical input and output region 162, and the first short side wall 120 itself configures a high-thermal resistance portion.

Therefore, in the optical modulator 100, even in a case where a heat-generating electronic component is disposed close to the optical modulator 100, it is possible to suppress the occurrence of characteristic fluctuations and or the degradation of long-term reliability in the optical modulator 100 by suppressing the flow of heat into the input optical fiber 108 and the like and the optical components such as the lens 154 disposed in the light input terminal portion 150 and the light output terminal portion 152. In such a configuration, furthermore, when the wall thickness t2 of the first long side wall 124 and the wall thickness t3 of the second long side wall 126 are set to be thicker than those of conventional optical modulators as described above, it is possible to reduce the temperature gradient in the modulator housing 104 that is generated due to a heat-generating electronic component or the like and to further suppress characteristic fluctuations and the degradation of long-term reliability.

Figure 3:
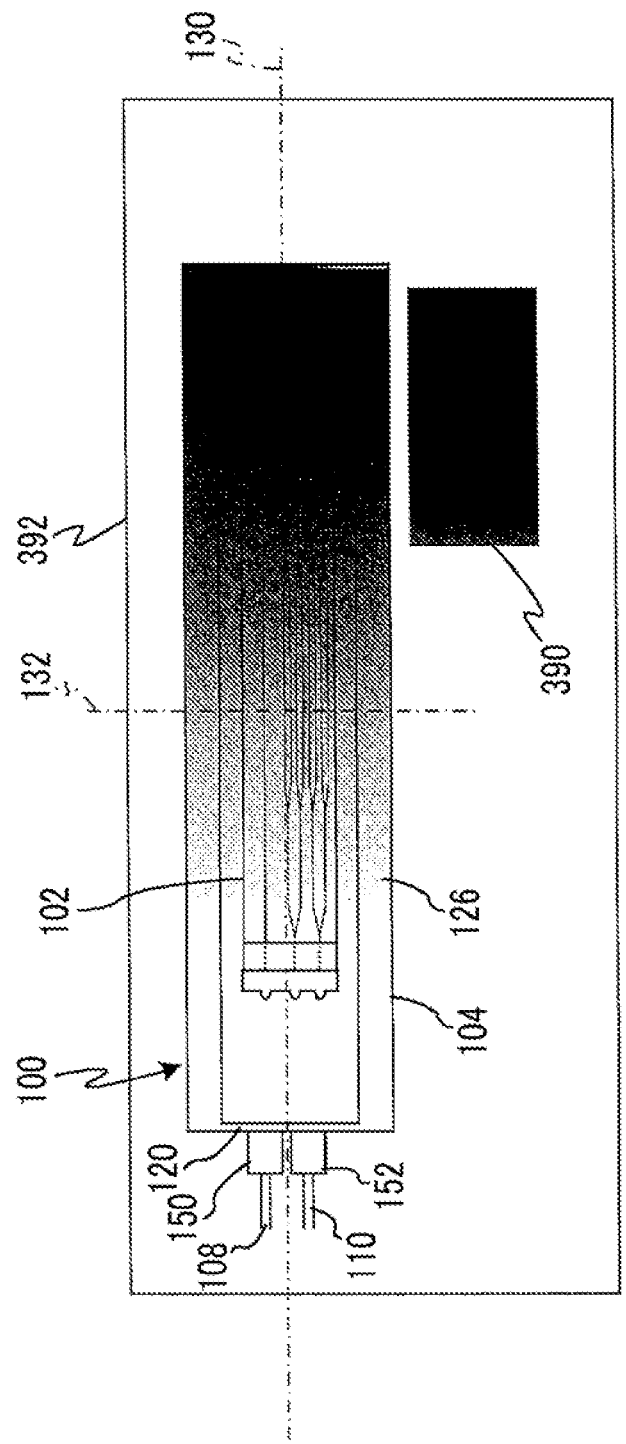
FIG. 3 is a view showing an example of a temperature distribution generated in a modulator housing in a case where the optical modulator shown in FIG. 1 is mounted on a circuit board.

FIG. 3 schematically shows a temperature distribution generated in the modulator housing 104 in a case where the optical modulator 100 is mounted on a circuit board 392 of an optical module together with, for example, a DSP 390, which is a heat-generating electronic component. Black/white shades shown over the modulator housing 104 shown in the drawing indicate the temperatures of individual portions and indicate that, as the white shade becomes lighter, the temperature becomes lower, and, as the black shade becomes darker, the temperature becomes higher. As shown in the drawing, in the optical modulator 100, as a result of the fact that heat flows along the first long side wall 124 and the second long side wall 126 that are thicker than the wall thicknesses of conventional optical modulators, the temperature gradient along the center line 130 with respect to the width direction becomes mild on both the first long side wall 124 side and the second long side wall 126 side. In addition, as a result, the symmetry of the temperature distribution that is generated in the modulator housing 104 improves.

Therefore, even in a case where the optical modulator 100 is disposed close to a heat-generating electronic component, stress generated in the modulator housing 104 is reduced and dispersed. In addition, the symmetry of the temperature distribution in the modulator housing 104 improves, whereby the temperature distribution in the optical modulation element 102, which is an interference type optical modulation element accommodated in the modulator housing 104, also becomes more symmetric. As a result, the difference in optical path length change or phase change between parallel waveguides that configure the optical modulation element 102 is reduced, and the characteristic fluctuations (for example, an operating point fluctuation) of the optical modulation element 102 is also suppressed.

In addition, as a result of the more symmetric temperature distribution state of the modulator housing 104, the modulator housing 104 in the optical module is more likely to be in a state of being placed in a uniform temperature environment as in a long-term reliability test in a constant-temperature bath. Therefore, the long-term reliability of the modulator housing 104 becomes close to the result of a long-term reliability test in a constant-temperature bath and thus can be further enhanced compared with those of conventional configurations.

It should be noted that, in the above-described embodiment, a wall thickness t4 of the second short side wall 122 shown in FIG. 1 and a wall thickness t5 of the bottom surface wall 128 in portions other than the optical input and output region 162 shown in FIG. 2 are preferably as large as possible from the viewpoint of the symmetry of the temperature distribution, heat dissipation, stiffness, and the like, and it is desirable that t4 is larger than t2 and t3 and t5 is larger than t2 and t3, respectively.

In addition, in the present embodiment, the wall thickness t1 of the first short side wall 120 is set to be thinner than the wall thickness t2 of the first long side wall 124 and the wall thickness t3 of the second long side wall 126 to configure a high-thermal resistance portion, but the configuration is not limited to this configuration. For example, instead of forming the average wall thickness of the first short side wall 120 as thin as the wall thickness t1 to configure a high-thermal resistance portion, the first short side wall 120 may be configured as a high-thermal resistance portion by using a material having a lower thermal conductivity than the material used to configure the first long side wall 124, the second long side wall 126 and or the bottom surface wall 128 (in more detail, the material of these walls in portions other than the optical input and output region 162) as a material for the first short side wall 120.

Second Embodiment

Next, a second embodiment of the present invention will be described. An optical modulator according to the present embodiment has a characteristic configuration in which a thin wall portion formed thinner than the average thickness of the bottom surface wall in a portion other than the optical input and output region is provided in at least a part of the optical input and output region that is the range from the outer surface of the first short side wall where the input optical fiber and the output optical fiber are disposed to the first end portion of the optical modulation element in the bottom surface wall and the thin wall portion of the bottom surface wall configures a high-thermal resistance portion.

Figure 4:
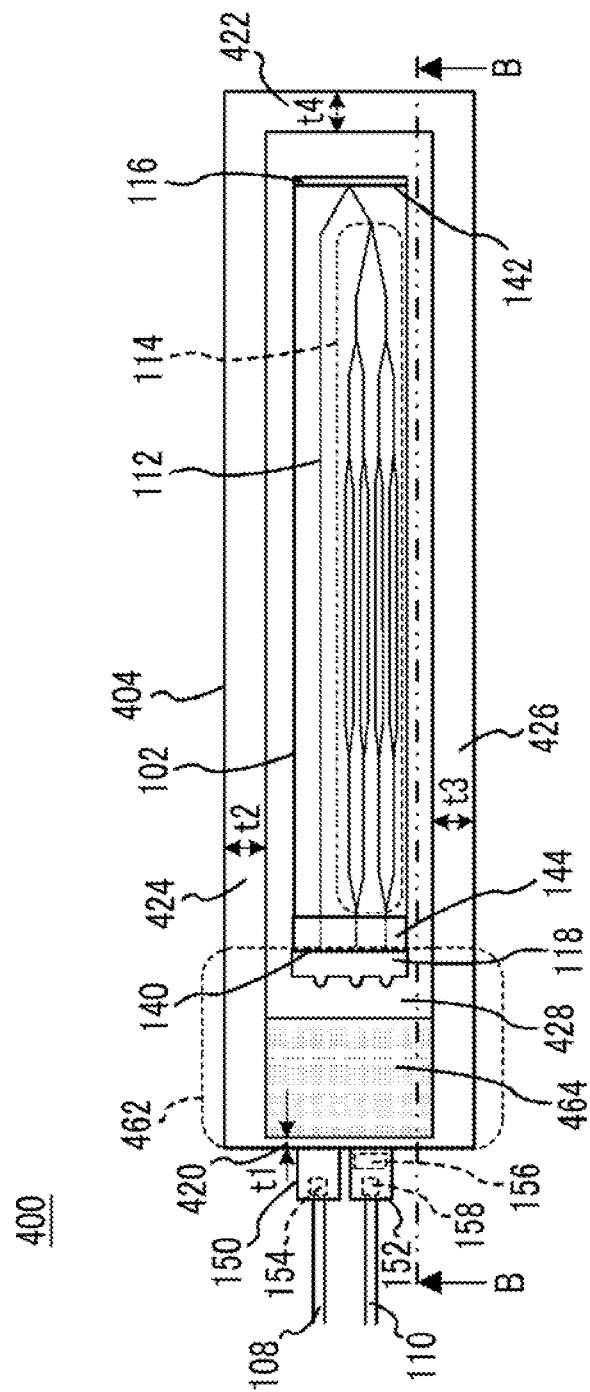
FIG. 4 is a plan view of an optical modulator according to a second embodiment of the present invention.
Figure 5:
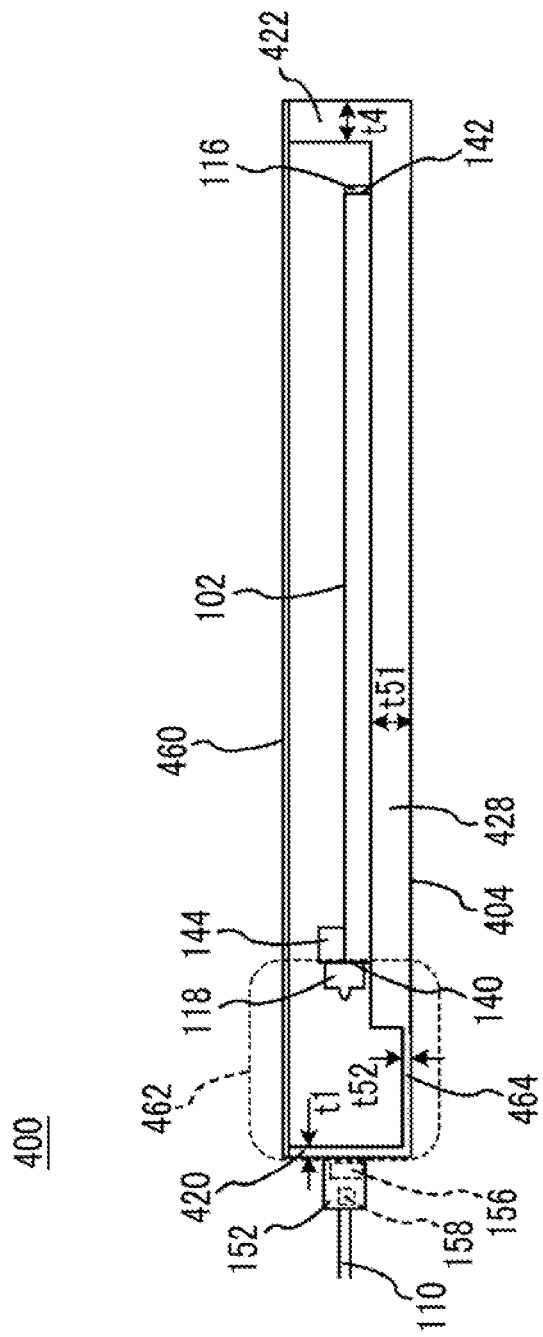
FIG. 5 is a cross-sectional view of the optical modulator shown in FIG. 4 taken along the line BB.

FIG. 4 is a plan view showing the configuration of an optical modulator 400 according to the second embodiment. In addition, FIG. 5 is a cross-sectional view of the optical modulator 400 shown in FIG. 4 taken along the line BB. It should be noted that, in FIG. 4 and FIG. 5, for the same configuration element and wall thickness as in the optical modulator 100 according to the first embodiment in FIG. 1 and FIG. 2, the same reference sign as in FIG. 1 and FIG. 2 is used, and the description of the above-described optical modulator 100 will be incorporated. In addition, in FIG. 4, in order to facilitate the understanding of the configuration of the optical modulator 400, similar to FIG. 1, the internal structure, which cannot be observed in a state where the optical modulator 400 is completely assembled, is also indicated with solid lines.

The optical modulator 400 has the same configuration as the optical modulator 100, but is different in terms of the fact that a modulator housing 404 is provided instead of the modulator housing 104. The modulator housing 404 has a first short side wall 420, a second short side wall 422, a first long side wall 424, and a second long side wall 426 similar to the first short side wall 120, the second short side wall 122, the first long side wall 124, and the second long side wall 126 of the modulator housing 104. That is, the modulator housing 404 is configured such that the wall thickness t1 of the first short side wall 420 has relationships of t1<t2 and t1<t3 with the wall thickness t2 of the first long side wall 424 and the wall thickness t3 of the second long side wall 426 in portions other than an optical input and output region 462 that is a range from the outer surface of the first short side wall 420 to the first end portion 140 of the optical modulation element 102.

However, the modulator housing 404 is different from the modulator housing 104 in terms of the fact that a bottom surface wall 428 is provided instead of the bottom surface wall 128. As shown in FIG. 5, the bottom surface wall 428 has a thin wall portion 464 (the dot-hatched portion in the drawing) having a wall thickness t52 thinner than a wall thickness t51 of the bottom surface wall 428 in a portion other than the optical input and output region 462 in at least a part of the optical input and output region 462. Here, the thin wall portion 464 corresponds to a third thin wall portion. It should be noted that FIG. 5 also shows a cover 460 that configures a part of a housing 404.

The modulator housing 404 shown in FIG. 4, similar to the modulator housing 104 shown in FIG. 1, does not show any protrusion and recess for disposing the lead pins, the relay board, or the like, which are possibly provided in an actual modulator housing 404. That is, it is necessary to understand that the wall thickness of each of the first short side wall 420, the second short side wall 422, the first long side wall 424, the second long side wall 426, and the bottom surface wall 428 shown in FIG. 4 indicates the average wall thickness in each wall or a part of the wall. It should be noted that, in a case where the thin wall portion 464 is made up of, for example, a plurality of protrusions and recesses that are different in depth or opening size, the range of the thin wall portion 464 can be defined as a region including those protrusions and recesses.

In the optical modulator 400 having the above-described configuration, similar to the optical modulator 100, as a result of the fact that heat flows along the first long side wall 424 and the second long side wall 426 that are thicker than the wall thicknesses of conventional optical modulators, the temperature gradient becomes mild on both the first long side wall 424 side and the second long side wall 426 side, and the symmetry of the temperature distribution generated in the modulator housing 404 improves. Therefore, even in a case where the optical modulator 400 is disposed close to a heat-generating electronic component, the characteristic fluctuations and the degradation of long-term reliability of the optical modulator 400 are suppressed.

In addition, in the optical modulator 400, similar to the first short side wall 120 in the optical modulator 100, the first short side wall 420 is formed in the wall thickness t1 that is thinner than the wall thicknesses t2 and t3 of the first long side wall 424 and the second long side wall 426 in portions other than the optical input and output region 462 to configure a high-thermal resistance portion. In addition, furthermore, the thin wall portion 464 having the wall thickness t52 thinner than the wall thickness t51 in a portion other than the optical input and output region 462 is also formed in the bottom surface wall 428 to configure a high-thermal resistance portion. Therefore, in the optical modulator 400, heat flowing from the bottom surface wall 428 to the light input terminal portion 150 and the light output terminal portion 152 through the first short side wall 420 is also suppressed with the thin wall portion 464, whereby it is possible to further suppress the occurrence of characteristic fluctuations and or the degradation of long-term reliability in the optical modulator 400 compared with the optical modulator 100.

It should be noted that, in the present embodiment, the first short side wall 420 is formed in the wall thickness t1 to configure a high-thermal resistance portion, and the thin wall portion 464 is also provided in the bottom surface wall 428 to configure a high-thermal resistance portion, but the configuration is not limited to this configuration. For example, the high-thermal resistance portion may be configured using only the thin wall portion 464 in the bottom surface wall 428, and the first short side wall 420 may be formed in the same wall thickness as t2 and t3.

In addition, instead of forming the first short side wall 420 in the wall thickness t1 as in the first embodiment, the first short side wall 420 may be configured as a high-thermal resistance portion by using a material having a lower thermal conductivity than the material of the portions of the first long side wall 424, the second long side wall 426 and or the bottom surface wall 428 that configure portions other than the optical input and output region 462 as a material for the first short side wall 420. In addition, instead of forming the thin wall portion 464 in the bottom surface wall 428, the portion corresponding to the thin wall portion 464 may be configured as a high-thermal resistance portion by using a material having a lower thermal conductivity than the material of the portions of the first long side wall 424, the second long side wall 426 and or the bottom surface wall 428 that configure portions other than the optical input and output region 462 as a material for the portion in the bottom surface wall 428 that corresponds to the thin wall portion 464.

Third Embodiment

Next, a third embodiment of the present invention will be described. An optical modulator according to the present embodiment has a first thin wall portion and a second thin wall portion each having a thinner average wall thickness than the average wall thickness of each of the first long side wall and the second long side wall in a portion other than the optical input and output region in at least parts of the optical input and output region that is the range from the outer surface of the first short side wall to the first end portion of the optical modulation element in the first long side wall and the second long side wall, respectively, that are connected to the first short side wall where the input optical fiber and the output optical fiber are disposed. In addition, the optical modulator has a characteristic configuration in which the first thin wall portion and the second thin wall portion configure high-thermal resistance portions.

Figure 6:
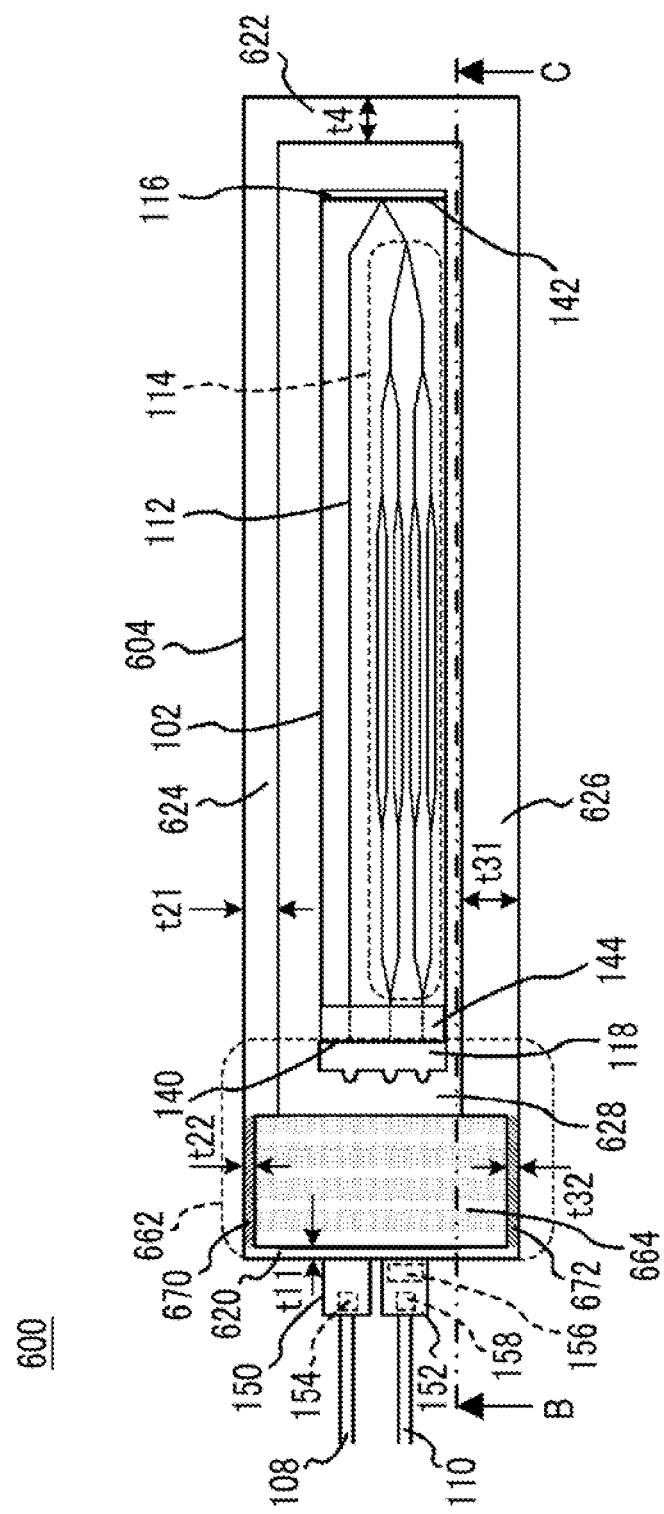
FIG. 6 is a plan view of an optical modulator according to a third embodiment of the present invention.
Figure 7:
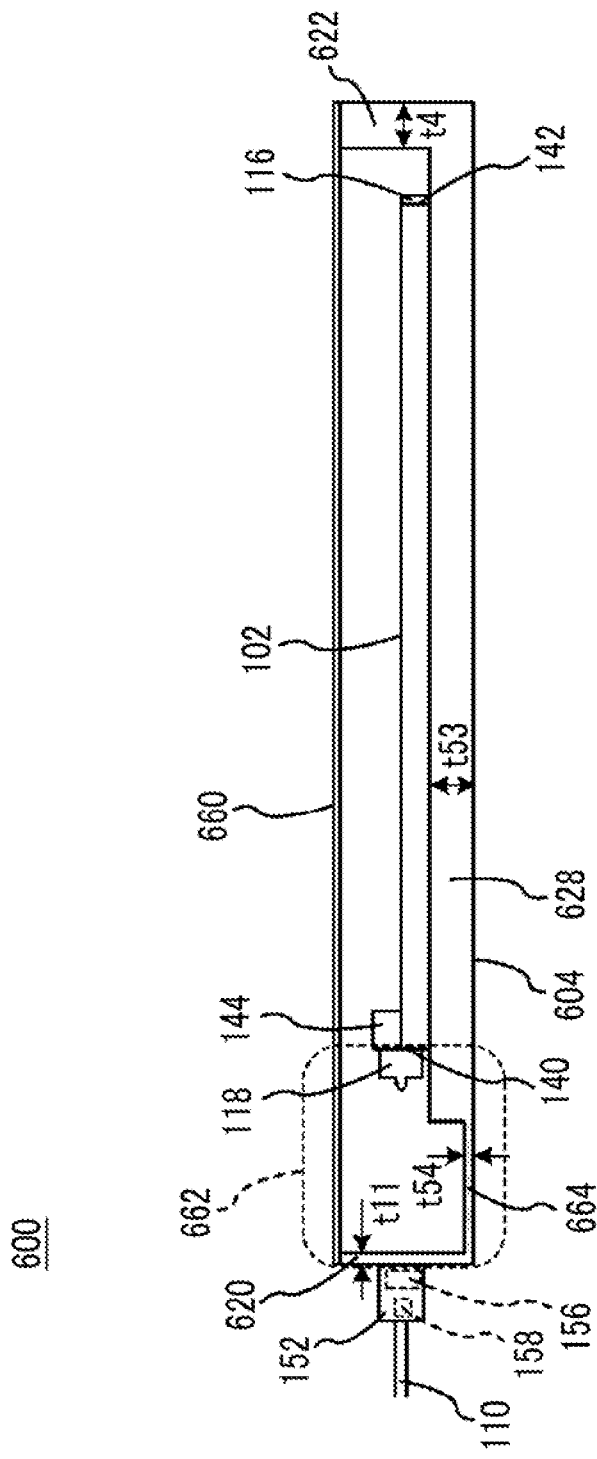
FIG. 7 is a cross-sectional view of the optical modulator shown in FIG. 6 taken along the line CC.

FIG. 6 is a plan view showing the configuration of an optical modulator 600 according to the third embodiment. In addition, FIG. 7 is a cross-sectional view of the optical modulator 600 shown in FIG. 6 taken along the line CC. It should be noted that, in FIG. 6 and FIG. 7, for the same configuration element as in the optical modulator 100 according to the first embodiment in FIG. 1 and FIG. 2, the same reference sign as in FIG. 1 and FIG. 2 is used, and the description of the above-described optical modulator 100 will be incorporated. In addition, in FIG. 6, in order to facilitate the understanding of the configuration of the optical modulator 600, similar to FIG. 1, the internal structure, which cannot be observed in a state where the optical modulator 600 is completely assembled, is also indicated with solid lines. It should be noted that FIG. 7 also shows a cover 660 that configures a part of a modulator housing 604, which is not shown in FIG. 6.

The optical modulator 600 has the same configuration as the optical modulator 100, but is different in terms of the fact that a modulator housing 604 is provided instead of the modulator housing 104. The modulator housing 604 has a first short side wall 620, a second short side wall 622, a first long side wall 624, a second long side wall 626, and a bottom surface wall 628 that are similar to the first short side wall 120, the second short side wall 122, the first long side wall 124, the second long side wall 126, and the bottom surface wall 128 of the modulator housing 104, respectively.

However, the first short side wall 620 is formed in a wall thickness t11 thinner than wall thicknesses t21 and t31 of the first long side wall 624 and the second long side wall 626 in portions other than an optical input and output region 662 that is a range from the outer surface of the first short side wall 620 to the first end portion 140 of the optical modulation element 102 to configure a high-thermal resistance portion.

In addition, in the bottom surface wall 628, a thin wall portion 664 (the dot-hatched portion in the drawing) having a wall thickness t54 thinner than a wall thickness t53 of the bottom surface wall 628 in a portion other than the optical input and output region 662 is formed in at least a part of the optical input and output region 662.

Furthermore, in the first long side wall 624, a thin wall portion 670 (the portion hatched diagonally down to the right in the drawing) having a wall thickness t22 thinner than the wall thickness t21 of the first long side wall 624 in a portion other than the optical input and output region 662 is formed in at least a part of the optical input and output region 662. In addition, in the second long side wall 626, a thin wall portion 672 (the portion hatched diagonally down to the left in the drawing) having a wall thickness t32 thinner than the wall thickness t31 of the second long side wall 626 in a portion other than the optical input and output region 662 is formed in at least a part of the optical input and output region 662.

Here, the thin wall portions 670, 672, and 664 correspond to the first thin wall portion, the second thin wall portion, and the third thin wall portion, respectively.

In the optical modulator 600 having the above-described configuration, similar to the optical modulator 100, as a result of the fact that heat flows along the first long side wall 624 and the second long side wall 626 that are thicker than the wall thicknesses of conventional optical modulators, the temperature gradient becomes mild on both the first long side wall 624 side and the second long side wall 626 side, and the symmetry of the temperature distribution generated in the modulator housing 604 improves. Therefore, even in a case where the optical modulator 600 is disposed close to a heat-generating electronic component, the characteristic fluctuations and the degradation of long-term reliability of the optical modulator 600 are suppressed.

In addition, in the optical modulator 600, since the first short side wall 620 and the thin wall portions 664, 670, and 672 configure high-thermal resistance portions, it is possible to effectively suppress the inflow into the light input terminal portion 150 and the light output terminal portion 152 of heat that flows to the modulator housing 604 from a DSP or the like, which is a heat-generating electronic component, in a case where the optical modulator 600 is mounted in an optical module or the like. Therefore, in the optical modulator 600, it is possible to further suppress the occurrence of characteristic fluctuations and or the degradation of long-term reliability in the optical modulator 600 compared with the optical modulator 100.

It should be noted that, in the present embodiment, the first long side wall 624 and the second long side wall 626 are configured such that the wall thicknesses t21 and t31 satisfy t21<t31. Such a configuration is convenient in a case where, for example, a heat-generating electronic component can be regulated to be mounted on any one of the long side wall sides when the optical modulator 600 is mounted in optical modules. When the wall thickness of one long side wall on which a heat-generating electronic component is mounted (in the present embodiment, for example, the second long side wall 626) is made thicker than the wall thickness of the other long side wall, it is possible to more effectively propagate heat from the heat-generating electronic component to a circuit board with the same weight compared with a configuration where the two long side walls are formed in the same wall thickness.

Here, even when the wall thicknesses t21 and t31 of the first long side wall 624 and the second long side wall 626 are set to t21=t31, the effect of the high-thermal resistance portions that are configured using the first short side wall 620 and the thin wall portions 664, 670, and 672 for suppressing characteristic fluctuations and the degradation of long-term reliability does not change.

In addition, in the present embodiment, the thin wall portions 664, 670, and 672 are provided, but the configuration is not limited to this configuration. Even when the thin wall portion 664 is not provided and only the thin wall portions 670 and 672 are provided, it is possible to obtain a certain degree of the effect for suppressing characteristic fluctuations and the degradation of reliability described above.

Fourth Embodiment

Next, a fourth embodiment of the present invention will be described. An optical modulator according to the present embodiment has the same configuration as the optical modulator 600 according to the third embodiment, and an optical component is disposed on the thin wall portion 664 in the bottom surface wall 628.

Figure 8:
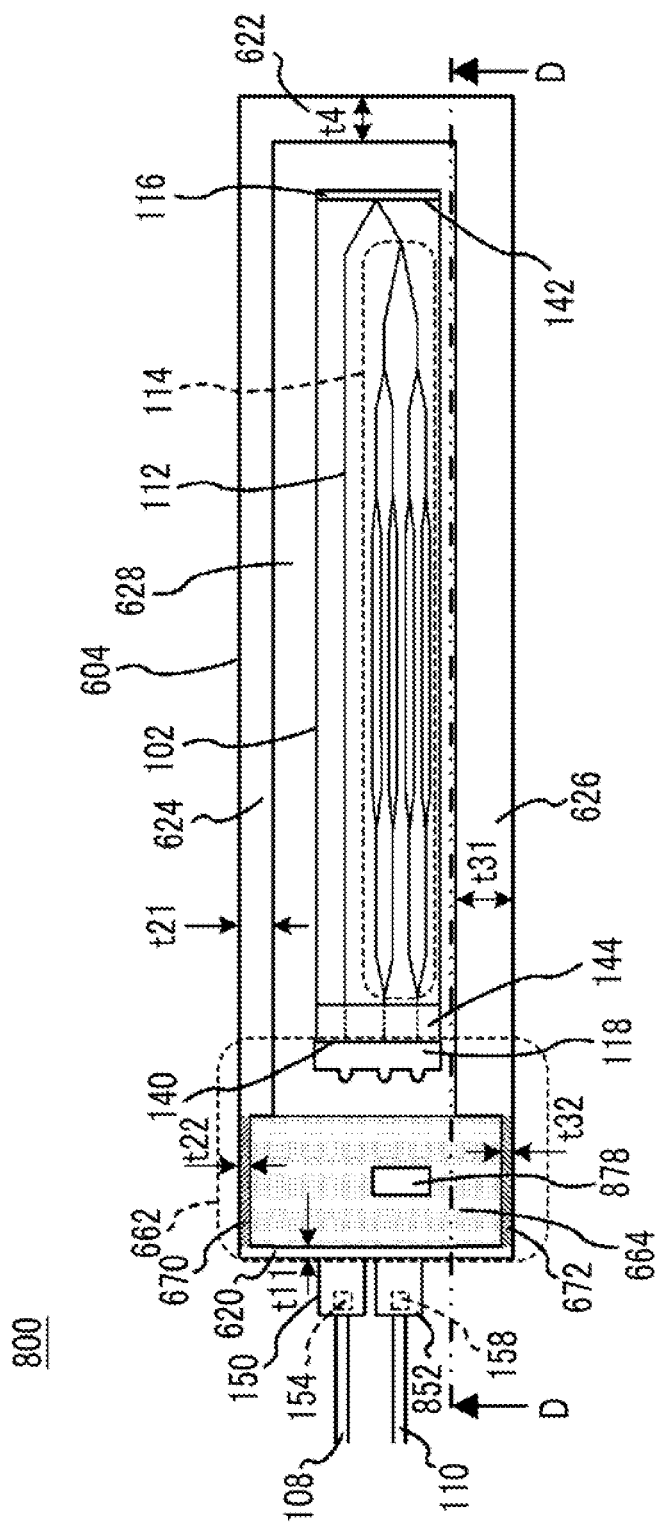
FIG. 8 is a plan view of an optical modulator according to a fourth embodiment of the present invention.
Figure 9:
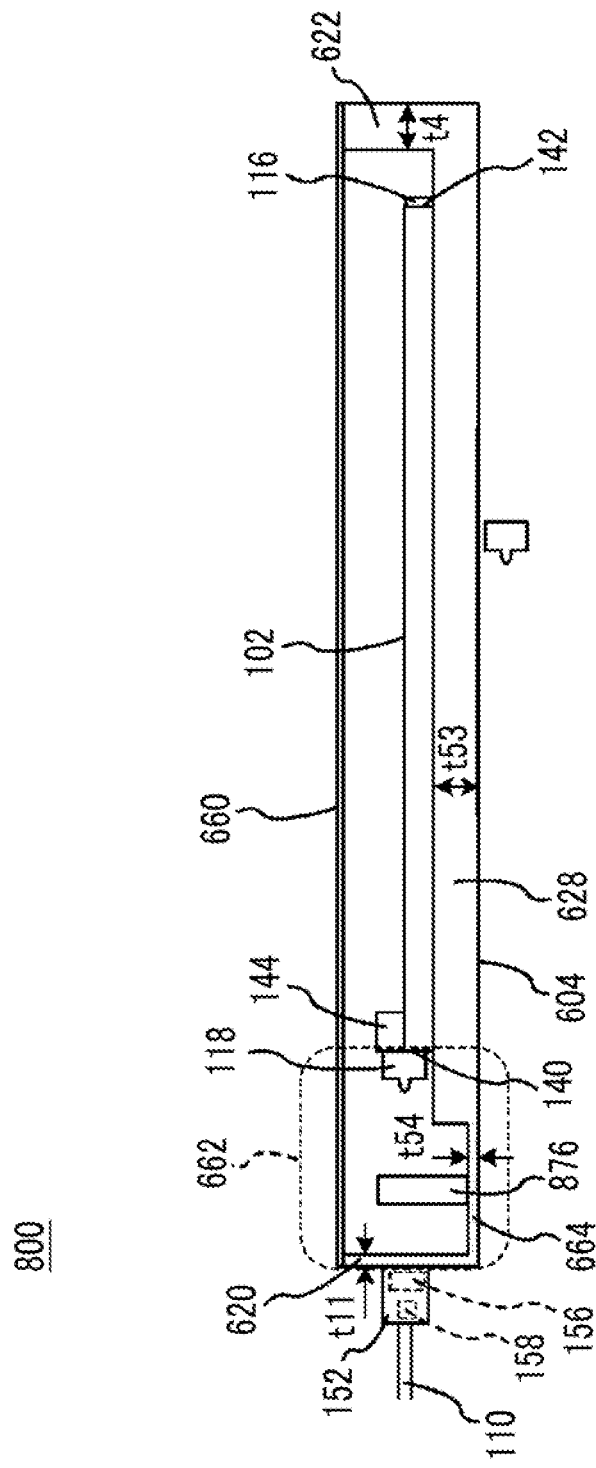
FIG. 9 is a cross-sectional view of the optical modulator shown in FIG. 8 taken along the line DD.

FIG. 8 is a plan view showing the configuration of an optical modulator 800 according to the fourth embodiment, and FIG. 9 is a cross-sectional view of the optical modulator 800 shown in FIG. 8 taken along the line DD. It should be noted that, in FIG. 8 and FIG. 9, for the same configuration element and wall thickness as in the optical modulator 600 according to the third embodiment in FIG. 6 and FIG. 7 and in the optical modulator 100 according to the first embodiment in FIG. 1 and FIG. 2, the same reference sign as in FIG. 6, FIG. 7, FIG. 1, and FIG. 2 is used, and the description of the above-described optical modulators 400 and 100 will be incorporated. In addition, in FIG. 8, in order to facilitate the understanding of the configuration of the optical modulator 800, similar to FIG. 1 and FIG. 4, the internal structure, which cannot be observed in a state where the optical modulator 800 is completely assembled, is also indicated with solid lines.

The optical modulator 800 has the same configuration as the optical modulator 600, but is different in terms of the fact that a light output terminal portion 852 is provided instead of the light output terminal portion 152, and an optical component group 876 is disposed in the thin wall portion 664 that configures the high-thermal resistance portion in the bottom surface wall 628 of the modulator housing 604. The light output terminal portion 852 has the same configuration as the light output terminal portion 152, but is different from the light output terminal portion 152 in terms of the fact that the light output terminal portion 852 does not have the polarization-combining part 156.

The optical component group 876 includes an optical component having the same function as the optical component disposed in the light output terminal portion 152 of the optical modulator 600, for example, the polarization-combining part 156 or the like, and includes, for example, a wave plate and a polarization beam combining prism.

Usually, the disposition of an optical component in the light output terminal portion is advantageous to the size reduction of optical modulators, but creates a number of restrictions on the size, shape, and or characteristics of the optical component and limits choices of optical components. In addition, since the distance from a light output end surface of the optical modulation element to the optical component becomes long compared with a configuration where the optical component is disposed in the modulator housing, even in a case where the output angle of light output from the optical modulation element fluctuates due to a temperature fluctuation or the like, the input point of light in the optical component significantly fluctuates, and the temperature characteristic of optical characteristics is likely to become poor.

In contrast, in the optical modulator 800, since the optical component group 876 is disposed in the thin wall portion 664 in the bottom surface wall 628 of the modulator housing 604, the restrictions on the shape (size) or characteristics (for example, dependence on the light input point) of, for example, a polarization beam combining prism, a wave plate, or the like that configures the optical component group 876 are mitigated. Therefore, the choices of these optical components are expanded.

In addition, compared with a configuration where the polarization-combining part 156 is disposed in the light output terminal portion 152, it becomes possible to decrease the distance from the first end portion 140 of the optical modulation element 102 to the optical component group 876 having, for example, a polarization beam combining prism. Therefore, it is also possible to suppress a change in optical characteristics caused by the fluctuation of the output angle of light from the optical modulation element 102 in association with the temperature fluctuation.

It should be noted that, in the optical component group 876, one or a plurality of arbitrary optical components can be included depending on a function or the like required for the optical modulator 800. For example, the lens 158 that is disposed in the light output terminal portion 852 can also be included in the optical component group 876 by drawing the output optical fiber 110 up to the inside of the modulator housing 604. In addition, the lens 154 that is disposed in the light input terminal portion 150 may be included in the optical component group 876 by drawing the input optical fiber 108 up to the inside of the modulator housing 604.

Fifth Embodiment

Next, a fifth embodiment of the present invention will be described. An optical modulator according to the present embodiment has the same configuration as the optical modulator 800 according to the fourth embodiment and has a characteristic configuration in which at least one of optical components disposed in the thin wall portion 664 in the bottom surface wall 628 is fixed to the thin wall portion 664 through a pedestal made of a separate body.

Figure 10:
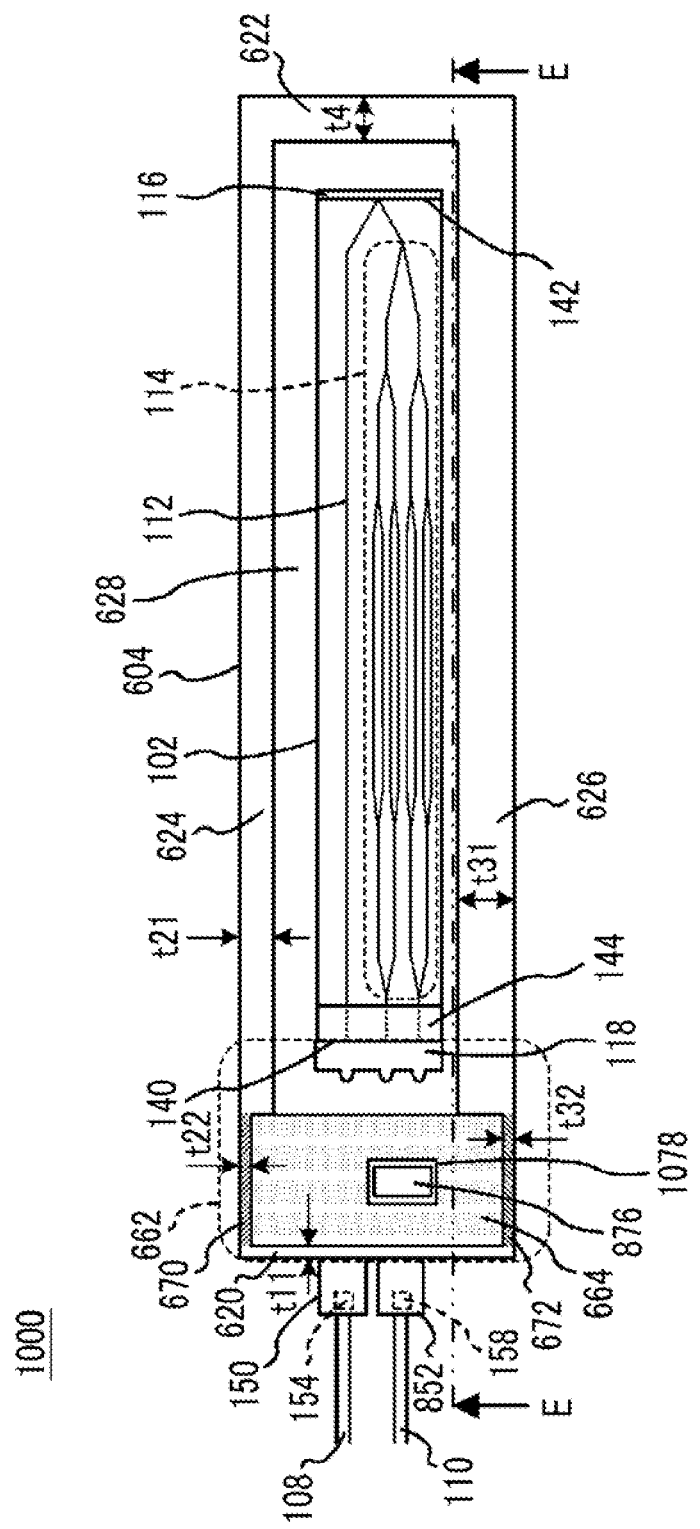
FIG. 10 is a plan view of an optical modulator according to a fifth embodiment of the present invention.
Figure 11:
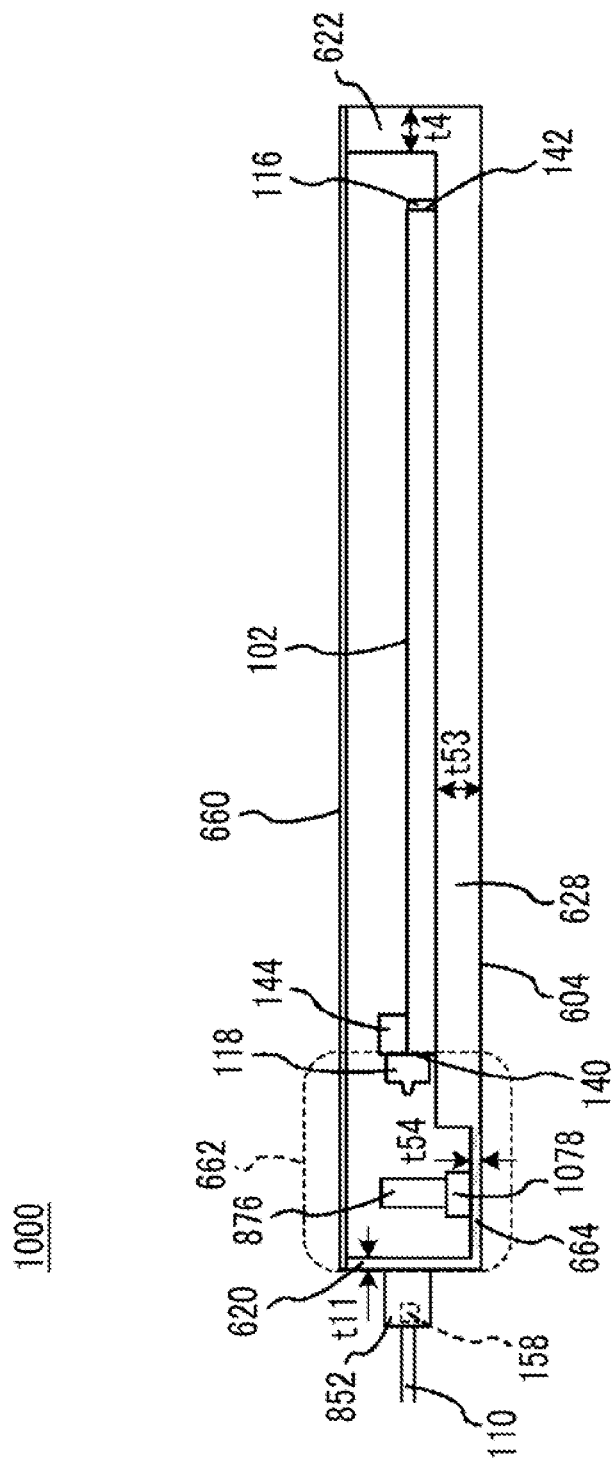
FIG. 11 is a cross-sectional view of the optical modulator shown in FIG. 10 taken along the line EE.

FIG. 10 is a plan view showing the configuration of an optical modulator 1000 according to the fifth embodiment, and FIG. 11 is a cross-sectional view of the optical modulator 1000 shown in FIG. 10 taken along the line EE. It should be noted that, in FIG. 10 and FIG. 11, for the same configuration element and wall thickness as in the optical modulator 800 according to the fourth embodiment in FIG. 8 and FIG. 9, the same reference sign as in FIG. 8 and FIG. 9 is used, and the description of the above-described optical modulator 800 will be incorporated. In addition, in FIG. 10, in order to facilitate the understanding of the configuration of the optical modulator 1000, similar to FIG. 8, the internal structure, which cannot be observed in a state where the optical modulator 1000 is completely assembled, is also indicated with solid lines.

The optical modulator 1000 has the same configuration as the optical modulator 600, but is different in terms of the fact that the optical component group 876 is disposed in the thin wall portion 664 that configures the high-thermal resistance portion in the bottom surface wall 628 of the modulator housing 604 through a pedestal 1078.

In the optical modulator 1000 having the above-described configuration, it is possible to sandwich the pedestal 1078 made of, for example, a material having a low thermal conductivity (for example, ceramic or the like) between the thin wall portion 664 in the bottom surface wall 628 and the optical component group 876 and to sandwich two thermal boundary surfaces (that is, a boundary surface between the thin wall portion 664 and the pedestal 1078 and a boundary surface between the pedestal 1078 and the optical component group 876). Therefore, it becomes possible to significantly suppress thermal conduction from the thin wall portion 664 to the optical component. Here, the boundary surface is desirably fixed with an adhesive having a lower thermal conductivity than the material of the modulator housing 604 (for example, an epoxy-based adhesive).

In addition, in the optical modulator 1000, it is possible to dispose the pedestal 1078 and the optical component group 876 in the thin wall portion 664 in the bottom surface wall 628 in a state where the optical component group 876 made up of a plurality of optical components is mounted on the pedestal 1078 and then the optical components are assembled and integrated on the pedestal 1078. Therefore, it becomes easy to handle the optical components, and it is possible to reduce the manufacturing man-hours and also to reduce manufacturing variations.

It should be noted that, in the present embodiment, all of the optical components disposed in the thin wall portion 664 configure the optical component group 876 and are fixed onto the thin wall portion 664 through the pedestal 1078, but the configuration is not limited to this configuration. At least one of the optical components disposed in the thin wall portion 664 may configure the optical component group 876 depending on the thermal resistance of the optical components, the ease of adjustment during the manufacturing of the optical modulator 1000, or the like and may be fixed onto the thin wall portion 664 through the pedestal 1078.

Sixth Embodiment

Next, a sixth embodiment of the present invention will be described. An optical modulator according to the present embodiment has a characteristic configuration in which a drive circuit that drives the optical modulation element is disposed in a rear portion that is a range from the second end portion that is opposite to the first end portion of the optical modulation element to the inner surface of the second short side wall of the modulator housing. In addition, the optical modulator has a characteristic configuration in which the average thickness of the bottom surface wall of the modulator housing in the rear portion is formed thicker than the average thickness in the optical input and output region that is the range from the outer surface of the first short side wall to the first end portion of the optical modulation element or the average thickness of the first long side wall or the second long side wall in the rear portion is formed thicker than the average thickness in the optical input and output region.

Figure 12:
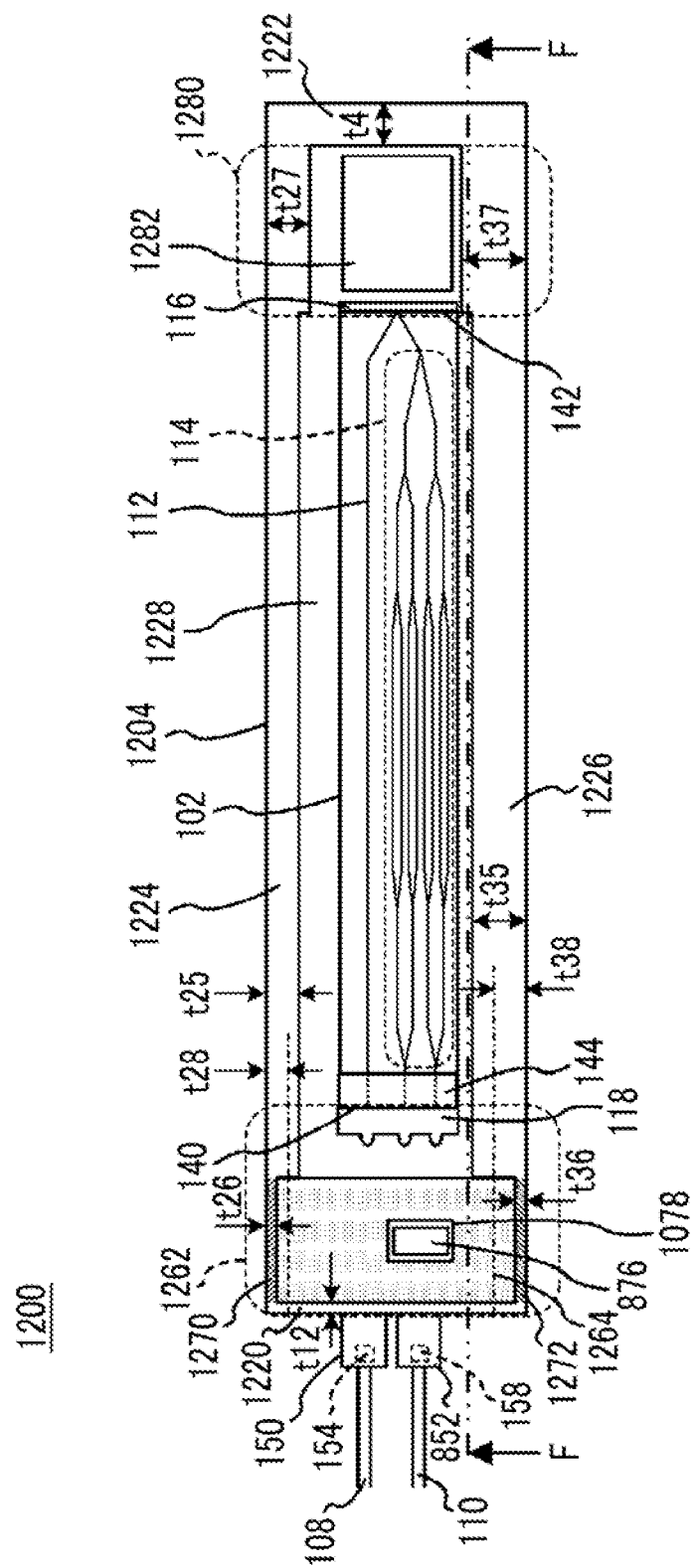
FIG. 12 is a plan view of an optical modulator according to a sixth embodiment of the present invention.
Figure 13:
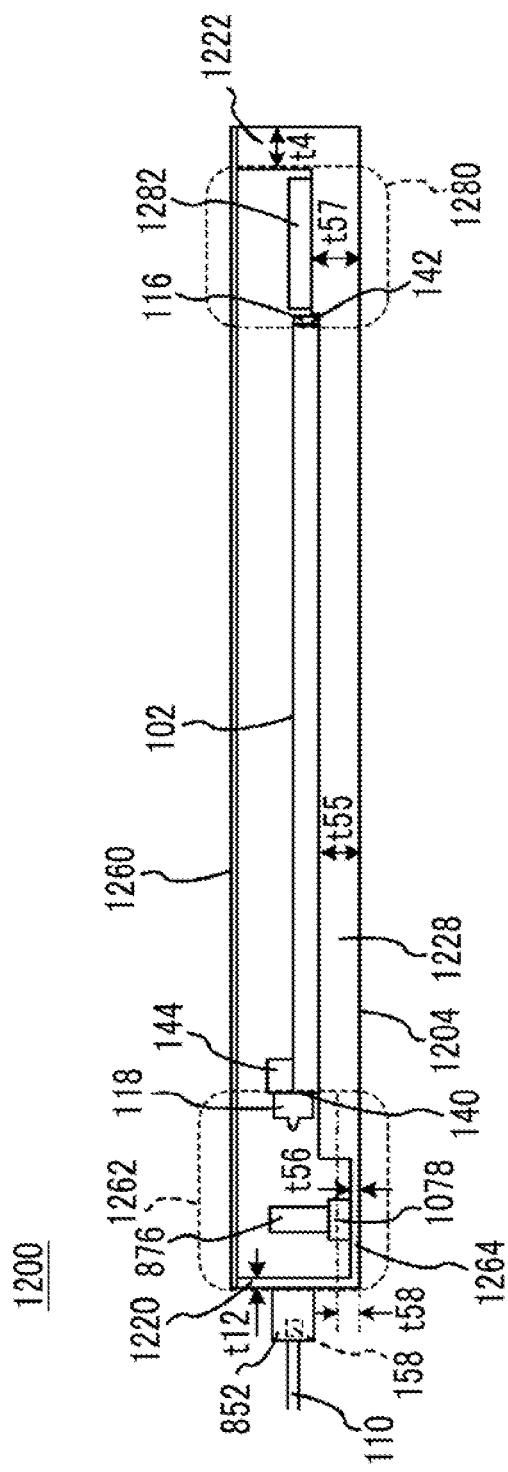
FIG. 13 is a cross-sectional view of the optical modulator shown in FIG. 12 taken along the line FF.

FIG. 12 is a plan view showing the configuration of an optical modulator 1200 according to the sixth embodiment, and FIG. 13 is a cross-sectional view of the optical modulator 1200 shown in FIG. 12 taken along the line FF. It should be noted that, in FIG. 12 and FIG. 13, for the same configuration element and wall thickness as in the optical modulator 1000 according to the fifth embodiment in FIG. 10 and FIG. 11, the same reference sign as in FIG. 10 and FIG. 11 is used, and the description of the above-described optical modulator 1000 will be incorporated. In addition, in FIG. 12, in order to facilitate the understanding of the configuration of the optical modulator 1200, similar to FIG. 10, the internal structure, which cannot be observed in a state where the optical modulator 1200 is completely assembled, is also indicated with solid lines.

The optical modulator 1200 has the same configuration as the optical modulator 1000, but is different in terms of the fact that a modulator housing 1204 is provided instead of the modulator housing 604. The modulator housing 1204 has a first short side wall 1220, a second short side wall 1222, a first long side wall 1224, a second long side wall 1226, and a bottom surface wall 1228 similar to the first short side wall 620, the second short side wall 622, the first long side wall 624, the second long side wall 626, and the bottom surface wall 628 of the modulator housing 604.

However, the first short side wall 1220 is formed in a wall thickness t12 thinner than wall thicknesses t25 and t35 of the first long side wall 1224 and the second long side wall 1226 in portions other than an optical input and output region 1262 that is a range from the outer surface of the first short side wall 1220 to the first end portion 140 of the optical modulation element 102 to configure a high-thermal resistance portion.

In addition, in FIG. 13, in the bottom surface wall 1228, a thin wall portion 1264 having a wall thickness t56 thinner than a wall thickness t55 of the bottom surface wall 1228 in a portion other than the optical input and output region is formed in at least a part of the optical input and output region 1262. It should be noted that FIG. 13 also shows a cover 1260 that configures a part of the modulator housing 1204, which is not shown in FIG. 12.

Returning to FIG. 12, furthermore, in the first long side wall 1224, a thin wall portion 1270 having a wall thickness t26 thinner than the wall thickness t25 of the first long side wall 1224 in a portion other than the optical input and output region 1262 is formed in at least apart of the optical input and output region 1262. In addition, in the second long side wall 1226, a thin wall portion 1272 having a wall thickness t36 thinner than the wall thickness t35 of the second long side wall 1226 in a portion other than the optical input and output region 1262 is formed in at least a part of the optical input and output region 1262.

Here, the thin wall portions 1270, 1272, and 1264 correspond to the first thin wall portion, the second thin wall portion, and the third thin wall portion and configure high-thermal resistance portions, respectively.

Furthermore, the optical component group 876 is fixed onto the thin wall portion 1264 through the pedestal 1078.

In addition, a driver IC 1282 including a drive circuit that drives the optical modulation element 102 is disposed in a rear portion 1280 that is a range from the second end portion 142 of the optical modulation element 102 to the inner surface of the second short side wall 1222 in the modulator housing 1204.

Particularly, in the optical modulator 1200, the bottom surface wall 1228 of the modulator housing 1204 is formed such that a wall thickness t57 in the rear portion 1280 becomes thicker than a wall thickness t58 in the optical input and output region 1262 (that is, the wall thickness t58 that is the average wall thickness in the optical input and output region 1262). In addition, the first long side wall 1224 and the second long side wall 1226 are formed such that wall thicknesses t27 and t37 in the rear portion 1280 are thicker than wall thicknesses t28 and t38 in the optical input and output region 1262 (that is, the wall thicknesses t28 and t38 that are the average wall thicknesses in the optical input and output region 1262, respectively).

In the optical modulator 1200 having the above-described configuration, similar to the optical modulator 100, as a result of the fact that heat flows along the first long side wall 1224 and the second long side wall 1226 that are thicker than the wall thicknesses of conventional optical modulators, the temperature gradient becomes mild on both the first long side wall 1224 side and the second long side wall 1226 side, and the symmetry of the temperature distribution generated in the modulator housing 1204 improves. Therefore, even in a case where the optical modulator 1200 is disposed close to a heat-generating electronic component, the characteristic fluctuations and the degradation of long-term reliability of the optical modulator 1200 are suppressed.

In addition, similar to the optical modulators 100, 400, 600, 800, and 1000 according to the first to fifth embodiments, the optical modulator 1200 has the thin wall portion 1264 or the like that configures a high-thermal resistance portion, whereby it is possible to suppress characteristic fluctuations and or the degradation of long-term reliability in a case where a heat-generating electronic component is disposed close to the optical modulator 1200. Additionally, in addition to what has been described above, in the optical modulator 1200, since the driver IC 1282 that drives the optical modulation element 102 is disposed adjacent to the optical modulation element 102, the transmission distance of high -frequency signals from the driver IC 1282 to the optical modulation element 102 becomes short, and it is possible to significantly improve the high-frequency characteristics of an optical modulation operation as a whole.

The driver IC 1282 is typically a heat-generating electronic component capable of generating approximately 1 W of heat. In the case of being disposed close to the outside of an optical modulator in an optical module as in the related art, the driver IC 1282 acts as an eccentric heat source with respect to the optical modulator and may generate an asymmetric temperature distribution in the housing of the optical modulator. In contrast, in the optical modulator 1200, the driver IC 1282 is disposed in the rear portion 1280 on the side that faces the optical input and output region 1262 in the modulator housing 1204, and the wall thickness t57 of the bottom surface wall 1228 in the rear portion 1280 is formed thicker than the wall thickness t58 of the bottom surface wall 1228 in the optical input and output region 1262. In addition, the first long side wall 1224 and the second long side wall 1226 are formed such that the wall thicknesses t27 and t37 in the rear portion 1280 in which the driver IC 1282 is disposed are thicker than the wall thicknesses t28 and t38 of the first long side wall 1224 and the second long side wall 1226 in the optical input and output region 1262, respectively.

Therefore, in the optical modulator 1200, it is possible to cause heat generated from the driver IC 1282 to flow substantially symmetrically with respect to the width direction of the modulator housing 1204 and to substantially symmetrically generate the temperature distribution in the modulator housing 1204 attributed to the above-described heat. That is, in the optical modulator 1200, it is possible to dispose the driver IC 1282, which acts as an eccentric heat source in the related art, at a position in the modulator housing 1204 where the driver IC 1282 does not generate an asymmetric temperature distribution and also to secure the dissipation of heat from the driver IC 1282 while improving the thermal environment of the optical modulator 1200 itself in optical modules.

It should be noted that, in the present embodiment, the wall thickness t57 of the bottom surface wall 1228 in the rear portion 1280 is formed thicker than the wall thickness t58 in the optical input and output region 1262, and the wall thicknesses t27 and t37 of the first long side wall 1224 and the second long side wall 1226 in the rear portion 1280 are formed thicker than the wall thicknesses t28 and t38 in the optical input and output region 1262, respectively, but the configuration is not limited to this configuration. The modulator housing 1204 is capable of obtaining the same effect as described above on a certain level when satisfying any one of

- a requirement that the wall thickness t57 of the bottom surface wall 1228 in the rear portion 1280 is formed thicker than the wall thickness t58 in the optical input and output region 1262,
- a requirement that the wall thickness t27 of the first long side wall 1224 in the rear portion 1280 is formed thicker than the wall thickness t28 in the optical input and output region 1262, or
- a requirement that the wall thickness t37 of the second long side wall 1226 in the rear portion 1280 is formed thicker than the wall thickness t38 in the optical input and output region 1262.

Seventh Embodiment

Next, a seventh embodiment of the present invention will be described. An optical modulator according to the present embodiment has a characteristic configuration in which an optical component is fixed to the first end portion of the optical modulation element, the bottom surface wall of the modulator housing has two flat surfaces that are different in height from the outer surface of the bottom surface wall on the inner surface, and the optical modulation element is disposed on the bottom surface wall such that the first end portion protrudes from a stepped portion made up of the two flat surfaces.

Figure 14:
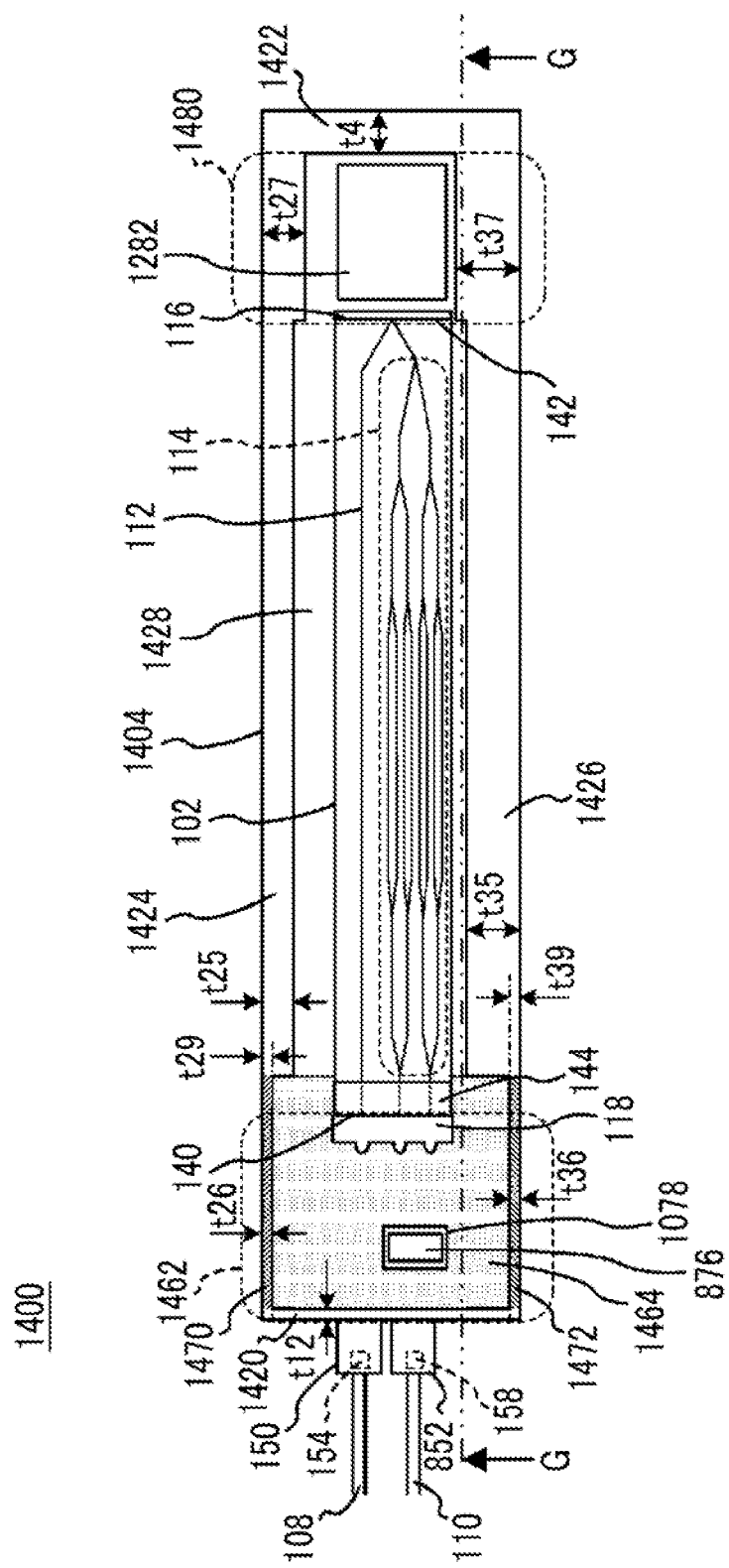
FIG. 14 is a plan view of an optical modulator according to a seventh embodiment of the present invention.
Figure 15:
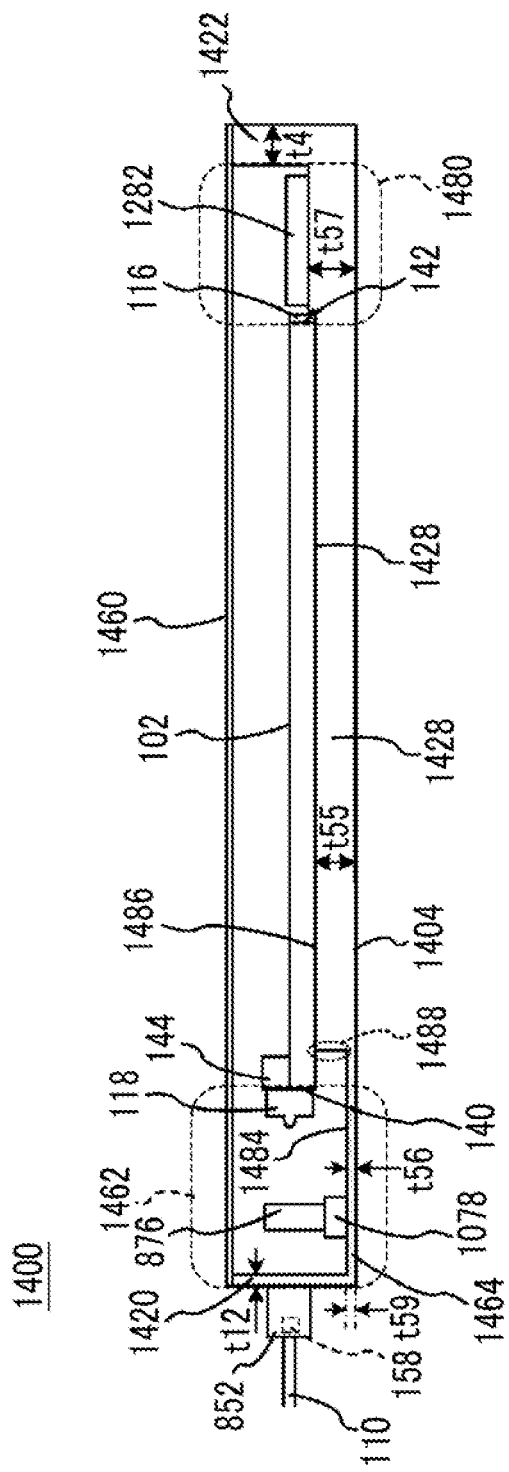
FIG. 15 is a cross-sectional view of the optical modulator shown in FIG. 14 taken along the line GG.

FIG. 14 is a plan view showing the configuration of an optical modulator 1400 according to the seventh embodiment, and FIG. 15 is a cross-sectional view of the optical modulator 1400 shown in FIG. 14 taken along the line GG. It should be noted that, in FIG. 14 and FIG. 15, for the same configuration element and wall thickness as in the optical modulator 1200 according to the sixth embodiment in FIG. 12 and FIG. 13, the same reference sign as in FIG. 12 and FIG. 13 is used, and the description of the above-described optical modulator 1200 will be incorporated. In addition, in FIG. 14, in order to facilitate the understanding of the configuration of the optical modulator 1400, similar to FIG. 12, the internal structure, which cannot be observed in a state where the optical modulator 1400 is completely assembled, is also indicated with solid lines.

Similar to the optical modulator 1200, in the optical modulator 1400, the microlens array 118, which is an optical component, is fixed to the first end portion 140 of the optical modulation element 102 by, for example, adhesion.

The optical modulator 1400 has the same configuration as the optical modulator 1200, but is different in terms of the fact that a modulator housing 1404 is provided instead of the modulator housing 1204. The modulator housing 1404 has a first short side wall 1420, a second short side wall 1422, a first long side wall 1424, a second long side wall 1426, and a bottom surface wall 1428 similar to the first short side wall 1220, the second short side wall 1222, the first long side wall 1224, the second long side wall 1226, and the bottom surface wall 1228 of the modulator housing 1204.

However, the first short side wall 1420 is formed in a wall thickness t12 thinner than wall thicknesses t25 and t35 of the first long side wall 1424 and the second long side wall 1426 in portions other than an optical input and output region 1462 that is a range from the outer surface of the first short side wall 1420 to the first end portion 140 of the optical modulation element 102 to configure a high-thermal resistance portion.

In addition, in FIG. 15, in the bottom surface wall 1428, a thin wall portion 1464 having a wall thickness t56 thinner than a wall thickness t55 of the bottom surface wall 1428 in a portion other than the optical input and output region 1462 is formed in at least a part of the optical input and output region 1462. It should be noted that FIG. 15 also shows a cover 1460 that configures a part of a modulator housing 1404, which is not shown in FIG. 14.

Returning to FIG. 14, furthermore, in the first long side wall 1424, a thin wall portion 1470 having a wall thickness t26 thinner than the wall thickness t25 of the first long side wall 1424 in a portion other than the optical input and output region 1462 is formed in at least apart of the optical input and output region 1462. In addition, in the second long side wall 1426, a thin wall portion 1472 having a wall thickness t36 thinner than the wall thickness t35 of the second long side wall 1426 in a portion other than the optical input and output region 1462 is formed in at least a part of the optical input and output region 1462.

Here, the thin wall portions 1470, 1472, and 1464 correspond to the first thin wall portion, the second thin wall portion, and the third thin wall portion and configure high-thermal resistance portions, respectively.

Furthermore, the optical component group 876 is fixed onto the thin wall portion 1464 through the pedestal 1078.

In addition, the driver IC 1282 including a drive circuit that drives the optical modulation element 102 is disposed in a rear portion 1480 that is a range from the second end portion 142 of the optical modulation element 102 to the inner surface of the second short side wall 1422 in the modulator housing 1404.

In addition, the bottom surface wall 1428 of the modulator housing 1404 is formed such that a wall thickness t57 in the rear portion 1480 is thicker than a wall thickness t59 in the optical input and output region 1462 (that is, the wall thickness t59 that is the average wall thickness in the optical input and output region 1462). In addition, the first long side wall 1424 and the second long side wall 1426 are formed such that wall thicknesses t27 and t37 in the rear portion 1480 are thicker than wall thicknesses t29 and t39 in the optical input and output region 1462 (that is, the wall thicknesses t29 and t39 that are the average wall thicknesses in the optical input and output region 1462, respectively).

Furthermore, in the optical modulator 1400, the bottom surface wall 1428 of the modulator housing 1404 has, on the inner surface, a thin wall inner surface 1484 that is the upper surface of the thin wall portion 1464 in FIG. 15 and a modulator-fixed surface 1486 to which the optical modulation element 102 is fixed as two flat surfaces that are different in height from the outer surface of the bottom surface wall 1428. In addition, the thin wall inner surface 1484 and the modulator-fixed surface 1486 configure a stepped portion 1488. In addition, the optical modulation element 102 is disposed on the modulator-fixed surface 1486 of the bottom surface wall 1428 such that the first end portion 140 protrudes toward the thin wall inner surface 1484 from the stepped portion 1488 made up of the thin wall inner surface 1484 and the modulator-fixed surface 1486.

In the optical modulator 1400 having the above-described configuration, since the portion of the first end portion 140 in the optical modulation element 102 protrudes from the stepped portion 1488, a fixation portion between the microlens array 118, which is an optical component that is relatively sensitive to heat or temperature, and the first end portion 140 is separated from the bottom surface wall 1428. Therefore, thermal conduction to the fixation portion is further suppressed. As a result, characteristic fluctuations and the degradation of long-term reliability attributed to the disposition of the optical modulator close to a heat-generating electronic component are further suppressed.

It should be noted that, in the present embodiment, the microlens array 118 has been described as an optical component that is fixed to the first end portion 140, but the optical component is not limited to the microlens array 118. An arbitrary optical component may be fixed to the first end portion 140 of the optical modulation element 102. Such an optical component is, for example, any one or a plurality of a wave plate, a glass plate for a spacer, a lens, a prism, PBC, a collimator, an anisotropic crystal, a sapphire plate, a glass plate, a capillary, and the like.

It should be noted that, in the present embodiment, since the thin wall portions 1464, 1470, and 1472 are formed throughout the entire region of the optical input and output region 1462, the relationships between the wall thicknesses t59, t29, and t39, which are the average wall thicknesses in the optical input and output region 1462, and the wall thicknesses t56, t26, and t36 of the thin wall portions 1464, 1470, and 1472 formed in a uniform thickness satisfy t59=t56, t29=t26, and t39=t36. However, the configuration is not limited to this configuration. The thin wall portions 1470 and 1472 simply need to be provided in at least a part of the optical input and output region 1462.

In addition, in the present embodiment, one of the two flat surfaces that the bottom surface wall 1428 of the modulator housing 1404 has on the inner surface is made up of the thin wall inner surface 1484, which is the upper surface of the thin wall portion 1464, but the configuration is not limited to this configuration. The above-described one of the two flat surfaces may be a flat surface formed in the optical input and output region 1462 other than the thin wall inner surface 1484 as long as the flat surface forms the stepped portion together with at least the modulator-fixed surface 1486. In this case, the thin wall portion 1464 may be formed not in the entire region of the optical input and output region 1462 but in at least a part of the optical input and output region 1462.

Eighth Embodiment

Next, an eighth embodiment of the present invention will be described. The present embodiment is an optical module including the optical modulator according to any one of the embodiments described above and an electronic component.

Figure 16:
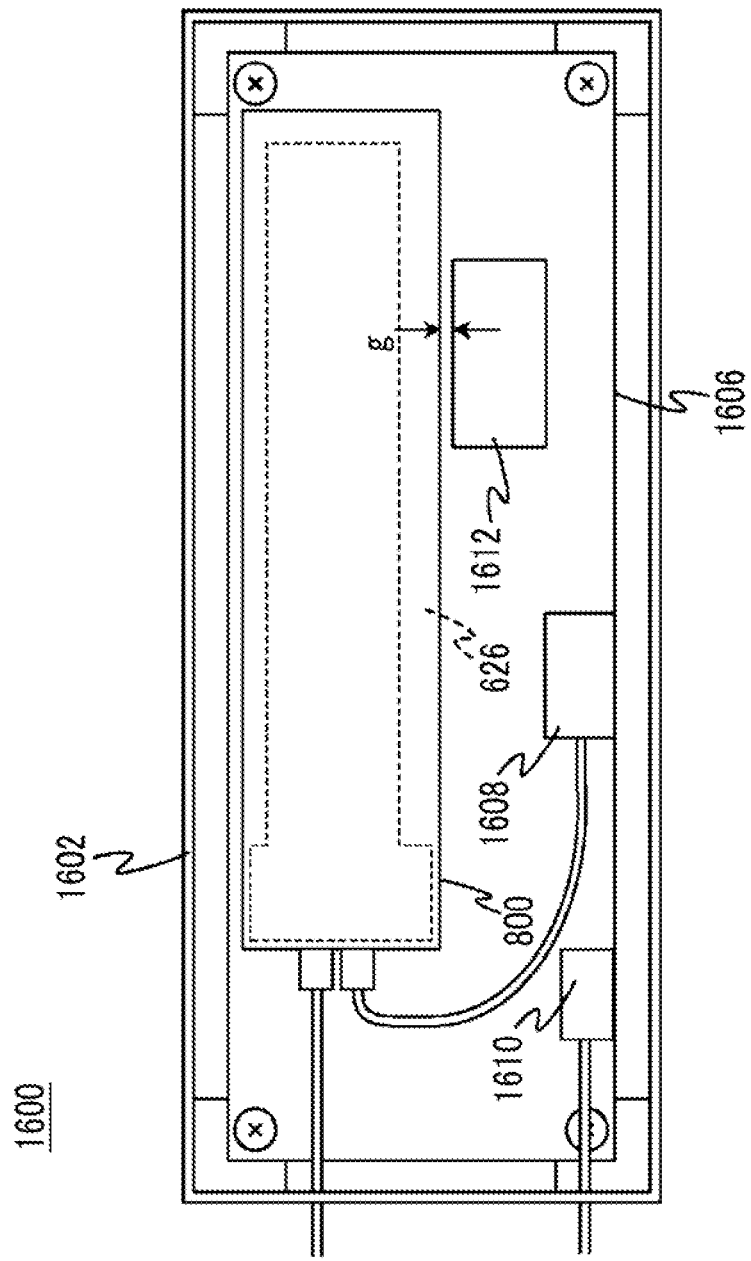
FIG. 16 is a plan view of an optical module according to an eighth embodiment of the present invention.

FIG. 16 is a plan view showing the configuration of an optical module 1600 according to the eighth embodiment. The optical module 1600 accommodates the optical modulator 800 and a circuit board 1606 in an optical module housing 1602. In the circuit board 1606, not only the optical modulator 800 is mounted, but a laser diode (LD) 1608 that is a light source of transmission light and a photo diode (PD) 1610, which is an optical receiver of reception light, are also mounted. In addition, in the circuit board 1606, an electronic component that configures an electronic circuit for operating these optical components is mounted. FIG. 16 shows a DSP 1612 for digital signal processing as an example of an electronic component that is an important electronic component and generates a large amount of heat.

Here, other optical components and electronic components may be mounted on the circuit board 1606 depending on functions required for the optical module 1600. Examples of such electronic components include a driver IC for driving the optical modulator 100 and the like. Therefore, the optical module 1600, for example, outputs signal light (transmission light) to one transmission channel optical fiber (not shown) through the optical modulator 800 and receives an optical signal (reception light) that has been transmitted by a different transmission channel optical fiber (not shown) with the PD 1610.

In the optical module 1600, particularly, the optical modulator 800 is mounted on the circuit board 1606 such that the DSP 1612 is disposed close to the second long side wall 626 having a thicker wall thickness than the first long side wall 624 with a predetermined clearance g between the DSP 1612 and the second long side wall 626. Here, the clearance g is, for example, 5 mm.

In the optical module 1600 having the above-described configuration, since the optical modulator 800 in which characteristic fluctuation and the degradation of long-term reliability attributed to the optical modulator 800 disposed close to a heat-generating electronic component are suppressed is used, it is possible to maintain the transmission quality of transmission light that is output from the optical module 1600 at a high level while reducing the size of the optical module 1600 by mitigating the restriction on the separation distance between the optical module 800 and an electronic component and also to suppress the degradation of long-term reliability in the optical module 1600 as a whole.

It should be noted that, in the present embodiment, the optical module 1600 is configured using the optical modulator 800, but the configuration is not limited to this configuration. The optical module 1600 may be configured by disposing the optical modulator 100, 400, 600, 1000, 1200, or 1400 instead of the optical modulator 800 at the same position as the optical modulator 800 on the circuit board 1606 shown in FIG. 16.

As described above, the optical modulator 100 or the like according to the present invention includes the optical modulation element 102 made up of optical waveguides formed on a substrate and the modulator housing 104 or the like that accommodates the optical modulation element. The modulator housing 104 or the like has the bottom surface wall 128 or the like having a quadrilateral shape in a plan view, the first short side wall 120 or the like and the second short side wall 122 or the like that are connected to two opposite edges of the bottom surface wall 128 or the like, the first long side wall 124 or the like and the second long side wall 126 or the like that are longer than the first short side wall 120 or the like and the second short side wall 122 or the like and are connected to the other two opposite edges of the bottom surface wall 128 or the like. In addition, the optical modulation element 102 is accommodated in the space surrounded by the bottom surface wall 128 or the like, the first long side wall 124 or the like, the second long side wall 126 or the like, the first short side wall 120 or the like, and the second short side wall 122 or the like. In addition, the light input terminal portion 150 that holds the input optical fiber 108 that inputs light to the optical modulation element 102 and the light output terminal portion 152 or the like that guides light output from the optical modulation element 102 to the outside of the modulator housing 104 or the like and holds the output optical fiber 110 are both fixed to the first short side wall 120 or the like. Furthermore, the optical modulation element 102 is disposed such that the first end portion 140 of the optical modulation element 102 in the longitudinal direction faces the first short side wall 120 or the like. In addition, the modulator housing 104 or the like has the high-thermal resistance portion having a higher thermal resistance than a portion of the modulator housing 104 or the like other than the optical input and output region 162 or the like in at least a part of the optical input and output region 162 or the like that is the range from the outer surface of the first short side wall 120 or the like to the first end portion 140 of the optical modulation element 102.

According to this configuration, even in a case where the optical modulator 100 or the like is disposed close to a heat-generating electronic component such as the DSP 390 in an optical module, which is an optical communication device, the symmetry of the temperature distribution generated in the modulator housing 104 improves, and the propagation of heat to the first short side wall 120 or the like where an optical fiber or an optical component can be disposed is suppressed, whereby it is possible to suppress characteristic fluctuations and or the degradation of long-term reliability in the optical modulator 100 or the like. In addition, since it is possible to transfer heat from a heat-generating electronic component by increasing the wall thickness of the modulator housing 104 or the like in a portion other than the optical input and output region 162 or the like while suppressing characteristic fluctuations and the degradation of long-term reliability by providing the high-thermal resistance portion in the optical input and output region 162 or the like, it is possible to use the optical modulator 100 or the like as a heat sink and or a favorable thermal conductor capable of actively contributing to improvement in thermal environment in optical modules.

In addition, in the optical modulator 100, the wall thickness t1 of the first short side wall 120 is formed thinner than the wall thicknesses t2 and t3 of the first long side wall 124 and the second long side wall 126 in portions other than the optical input and output region 162, respectively, and the first short side wall 120 configures the high-thermal resistance portion. According to this configuration, the symmetry of the temperature distribution generated in the modulator housing 104 is improved, and furthermore, the first short side wall 120 itself is configured as the high-thermal resistance portion, whereby the inflow of heat into the optical components such as the input optical fiber 108, the output optical fiber 110, and the lens 154 is suppressed, and it is possible to suppress characteristic fluctuations and the degradation of long-term reliability in the optical modulator 100.

In addition, in the optical modulator 600, the first long side wall 624 has the thin wall portion 670 that is the first thin wall portion having the wall thickness t22 thinner than the wall thickness t21 of the first long side wall 624 in a portion other than the optical input and output region 662 in at least a part of the portion included in the optical input and output region 662. In addition, the second long side wall 626 has the thin wall portion 672 that is the second thin wall portion having the wall thickness t32 thinner than the wall thickness t31 of the second long side wall 626 in a portion other than the optical input and output region 662 in at least a part of the portion included in the optical input and output region 662. In addition, the thin wall portion 670 in the first long side wall 624 and the thin wall portion 672 in the second long side wall 626 configure the high-thermal resistance portions.

According to this configuration, parts of the first long side wall 624 and the second long side wall 626 of the modulator housing 604 are configured as the high-thermal resistance portions, the optical modulator 600 is used as a heat sink and or a favorable thermal conductor by allowing the optical modulator 600 to be disposed close to a heat-generating electronic component, and it is possible to further suppress characteristic fluctuations and the degradation of long-term reliability in the optical modulator 600.

In addition, in the optical modulator 400, the bottom surface wall 428 has the thin wall portion 464 that is the third thin wall portion formed in the wall thickness t52 that is thinner than the wall thickness t51 of the bottom surface wall 428 in a portion other than the optical input and output region 462 in at least a part of the portion included in the optical input and output region 462, and the thin wall portion 464 configures the high-thermal resistance portion. According to this configuration, a part of the bottom surface wall 428 of the modulator housing 404 is configured as the high-thermal resistance portion, the optical modulator 600 is used as a heat sink and or a favorable thermal conductor by allowing the optical modulator 600 to be disposed close to a heat-generating electronic component, and it is possible to further suppress characteristic fluctuations and the degradation of long-term reliability in the optical modulator 600.

In addition, in the optical modulator 800, the optical component group 876 made up of optical components such as polarization beam combining prisms is disposed to the thin wall portion 664 that is the third thin wall portion that configures the high-thermal resistance portion provided on the bottom surface wall 628. According to this configuration, the distance from the first end portion 140 of the optical modulation element 102 from which light is output to the optical component is reduced, and the fluctuation range of the input point of light on the optical component is suppressed even in a case where the output angle of light output from the optical modulation element 102 fluctuates in association with the temperature characteristic or the like, whereby it is possible to suppress characteristic fluctuations.

In addition, in the optical modulator 1000, the optical component group 876 made up of at least one of the optical components disposed in the thin wall portion 664 in the bottom surface wall 628 is fixed onto the thin wall portion 664 of the bottom surface wall 628 through the pedestal 1078 that is a separate body. According to this configuration, since it is possible to sandwich thermal boundary surfaces between the thin wall portion 664 and the pedestal 1078 and between the pedestal 1078 and the optical component group 876, respectively, it is possible to suppress characteristic fluctuations and the degradation of long-term reliability by suppressing the inflow of heat from an optical component. In addition, since a plurality of optical components can be configured as one optical component group 876 on the pedestal 1078, it is possible to reduce the manufacturing man-hours and to reduce manufacturing variation.

In addition, in the optical modulator 1200, the driver IC 1282 including the drive circuit that drives the optical modulation element 102 is disposed in the rear portion 1280 that is the range from the second end portion 142 of the optical modulation element 102 that is opposite to the first end portion 140 to the inner surface of the second short side wall 1222. In addition, in the bottom surface wall 1228, the wall thickness t57 in the rear portion 1280 is formed thicker than the wall thickness t58 of the bottom surface wall 1228 in the optical input and output region 1262 or the first long side wall 1224 or the second long side wall 1226 is formed such that the wall thickness t27 or t37 in the rear portion 1280 is thicker than the wall thickness t28 or t38 in the optical input and output region 1262, respectively.

According to this configuration, since the driver IC 1282 is disposed in the modulator housing 1204, it is possible to improve the high-frequency characteristics. In addition, since the driver IC 1282 can be disposed at a position symmetric with respect to the width direction of the modulator housing 1204, it is possible to suppress characteristic fluctuations and the degradation of long-term reliability by suppressing the generation of an asymmetric temperature distribution in the modulator housing 1204 attributed to the disposition of the driver IC 1282 in the modulator housing 1204.

In addition, in the optical modulator 1400, the microlens array 118, which is an optical component, is fixed to the first end portion 140 of the optical modulation element 102, and the bottom surface wall 1428 has the stepped portion 1488 made up of the thin wall inner surface 1484 and the modulator-fixed surface 1486 that are the two flat surfaces that are different in height from the outer surface of the bottom surface wall 1428 on the inner surface. In addition, the optical modulation element 102 is disposed on the modulator-fixed surface 1486 of the bottom surface wall 1428 such that the first end portion 140 protrudes from the stepped portion 1488. According to this configuration, it is possible to further suppress characteristic fluctuations and the degradation of long-term reliability by suppressing the inflow of heat into the fixation portion with the microlens array 118 in the first end portion 140 of the optical modulation element 102.

In addition, the optical module 1600 according to the present invention includes the optical modulator 800 or the like according to the first to seventh embodiments and an electronic component such as the DSP 1612. According to this configuration, since the optical modulator 800 or the like in which characteristic fluctuation and the degradation of long-term reliability attributed to the disposition of the optical modulator 800 or the like close to a heat-generating electronic component are suppressed is used, it is possible to maintain the transmission quality of transmission light that is output from the optical module 1600 at a high level while reducing the size of the optical module 1600 by mitigating the restriction on the separation distance between the optical module 800 or the like and an electronic component and also to suppress the degradation of long-term reliability in the optical module 1600 as a whole.

It should be noted that the present invention is not limited to the configurations of the above-described embodiments and can be carried out in a variety of aspects within the scope of the gist of the present invention.

For example, it is possible to configure an optical modulator by arbitrarily combining one or a plurality of the characteristic configurations described in the first to seventh embodiments.

In addition, in the first to seventh embodiments, the optical modulation element 102 is made up of optical waveguides formed on the LiNbO$_3$ substrate, but the optical modulation element 102 is not limited to this configuration. For example, the optical modulation element 102 maybe made of a semiconductor such as InP or maybe made of an optical element of Si photonics. However, in the case of using an optical modulation element made up of optical waveguides formed on a LiNbO$_3$ substrate as the optical modulation element 102, usually, since the size of the modulator housing in the longitudinal direction becomes large compared with optical modulation elements or the like for which a semiconductor such as InP is used, it is possible to more preferably exhibit an effect of suppressing characteristic fluctuations and the degradation of long-term reliability and an effect as a heat sink and or a favorable thermal conductor with respect to heat-generating electronic components.

In addition, in each of the above-described embodiments, since the input optical fiber 108 and the output optical fiber 110 are both fixed to the first short side wall 120 or the like, the optical modulation element 102 where light is folded back by the light reflection film 116 in the second end portion 142 is used, but the configuration is not limited to this configuration. It is possible to use an optical modulation element having an arbitrary configuration instead of the optical modulation element 102. For example, instead of the optical modulation element 102, as described in Patent Literature 1, an optical modulation element and an optical component that configures the optical folded-back portion may be configured as separate components. In addition, a curved waveguide configured using PLC or the like as the light folded-back portion may be provided at one end portion of the optical modulation element.

Reference Signs List 100, 400, 600, 800, 1000, 1200, 1400, 1700 . . . Optical modulator,
102, 1702 . . . Optical modulation element
104, 404, 604, 1204, 1404, 1704 . . . Modulator housing
108, 1708 . . . Input optical fiber
110, 1710 . . . Output optical fiber
112 . . . Input waveguide
114 . . . Modulation portion
116 . . . Light reflection film
118 . . . Microlens array
120, 420, 620, 1220, 1420 . . . First short side wall
122, 422, 622, 1222, 1422 . . . Second short side wall
124, 424, 624, 1224, 1424 . . . First long side wall
126, 426, 626, 1226, 1426 . . . Second long side wall
128, 428, 628, 1228, 1428 . . . Bottom surface wall
130, 1720 . . . Center line with respect to width direction
132, 1722 . . . Center line with respect to longitudinal direction
140 . . . First end portion
142 . . . Second end portion
144 . . . Glass block
150 . . . Light input terminal portion
152, 852 . . . Light output terminal portion
154, 158 . . . Lens, 156 . . . Polarization-combining part
160, 460, 660, 1260, 1460 . . . Cover
162, 462, 662, 1262, 1462 . . . Optical input and output region
390, 1612, 1800 . . . DSP
392, 1606, 1802 . . . Circuit board
464, 664, 670, 672, 1264, 1270, 1272, 1464, 1470, 1472 . . . Thin wall portion
876 . . . Optical component group
1078 . . . Pedestal
1280, 1480 . . . Rear portion
1282 . . . Driver IC
1484 . . . Thin wall inner surface
1486 . . . Modulator-fixed surface
1488 . . . Stepped portion
1600 . . . Optical module
1602 . . . Optical module housing
1608 . . . LD
1610 . . . PD
1712 . . . Light folded-back portion
1714 . . . Output optical system

The invention claimed is:

1. An optical modulator comprising:
an optical modulation element including an optical waveguide formed on a substrate; and
a housing that accommodates the optical modulation element,
wherein the housing has a bottom surface wall having a quadrilateral shape in a plan view, a first short side wall and a second short side wall that are connected to two opposite edges of the bottom surface wall, and a first long side wall and a second long side wall that are longer than the first short side wall and the second short side wall and are connected to two other opposite edges of the bottom surface wall,
the optical modulation element is accommodated in a space surrounded by the bottom surface wall, the first long side wall and the second long side wall, and the first short side wall and the second short side wall,
a light input terminal portion that holds an input optical fiber that inputs light to the optical modulation element and a light output terminal portion that holds an output optical fiber that guides light output from the optical modulation element to an outside of the housing are both fixed to the first short side wall,
the optical modulation element is disposed such that a first end portion of the optical modulation element in a longitudinal direction faces the first short side wall,
the housing has a high-thermal resistance portion within at least a part of an optical input and output region, the optical input and output region being an area ranging from an outer surface of the first short side wall to the first end portion of the optical modulation element, and the high-thermal resistance portion having a higher thermal resistance than a portion of the housing other than the optical input and output region, and the first short side wall is formed such that an average thickness of the first short side wall is thinner than an average thickness of a portion of the first long side wall other than the optical input and output region and is thinner than an average thickness of a portion of the second long side wall other than the optical input and output region.

2. The optical modulator according to claim 1,
wherein the first long side wall has a first thin wall portion within at least a part of a portion included in the optical input and output region, the first thin wall portion having an average thickness thinner than an average thickness of a portion of the first long side wall outside the optical input and output region,
the second long side wall has a second thin wall portion within at least a part of a portion included in the optical input and output region, the second thin wall portion having an average thickness thinner than an average thickness of a portion of the second long side wall outside the optical input and output region, and
the first thin wall portion in the first long side wall and the second thin wall portion in the second long side wall configure the high-thermal resistance portion.

3. The optical modulator according to claim 1,
wherein the bottom surface wall has a third thin wall portion within at least a part of a portion included in the optical input and output region, the third thin wall portion having an average thickness thinner than an average thickness of a portion of the bottom surface wall outside the optical input and output region, and the third thin wall portion in the bottom surface wall configures the high-thermal resistance portion.

4. The optical modulator according to claim 3,
wherein optical components are disposed on the third thin wall portion in the bottom surface wall.

5. The optical modulator according to claim 4,
wherein at least one of the optical components disposed on the third thin wall portion in the bottom surface wall is fixed to the third thin wall portion in the bottom surface wall through a pedestal that is a separate body.

6. The optical modulator according to claim 1,
wherein, in the housing, a drive circuit that drives the optical modulation element is disposed in a rear portion that is a range from a second end portion of the optical modulation element that is opposite to the first end portion to an inner surface of the second short side wall, and
the bottom surface wall is formed such that an average thickness in the rear portion is thicker than an average thickness in the optical input and output region or
the first long side wall or the second long side wall is formed such that an average thickness in the rear portion is thicker than an average thickness in the optical input and output region.

7. The optical modulator according to claim 1,
wherein an optical component is fixed to the first end portion of the optical modulation element,
the bottom surface wall has, on an inner surface, a stepped portion that connects two flat surfaces that are different in height from an outer surface of the bottom surface wall, and
the optical modulation element is disposed on the bottom surface wall such that the first end portion protrudes from the stepped portion.

8. An optical module comprising:
the optical modulator according to claim 1; and
an electronic component.

* * * * *